(12) United States Patent
Isoyama et al.

(10) Patent No.: US 6,373,017 B1
(45) Date of Patent: *Apr. 16, 2002

(54) CONTINUOUS HOT ROLLING MILL WITH METAL BLOCK CONVEYING APPARATUS

(75) Inventors: Shigeru Isoyama; Takeshi Hirabayashi; Hideyuki Nikaido; Hirosuke Yamada; Nozomu Tamura; Toshiaki Amagasa; Toshisada Takechi; Katsuhiro Takebayashi, all of Chiba; Kanji Hayashi, Hiroshima; Kunio Miyamoto, Hiroshima; Akio Kuroda, Hiroshima; Kazunori Nagai, Hiroshima; Yoshiki Mito, Hiroshima; Kazuo Morimoto, Hiroshima; Kazuya Tsurusaki, Hiroshima; Kiyoshi Izumi, Hiroshima, all of (JP)

(73) Assignees: Kawasaki Steel Corporation, Hyogo; Mitsubishi Jukogyo Kabushiki Kaisha, Tokyo, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/415,609

(22) Filed: Oct. 9, 1999

Related U.S. Application Data

(60) Division of application No. 08/946,638, filed on Oct. 7, 1997, now Pat. No. 6,164,525, which is a division of application No. 08/387,788, filed on Feb. 15, 1995, now Pat. No. 5,753,894, and a continuation of application No. PCT/JP94/00968, filed on Jun. 15, 1994.

(30) Foreign Application Priority Data

Jun. 15, 1993 (JP) .............................. 5-167362
Jun. 17, 1993 (JP) .............................. 5-169850
Nov. 4, 1993 (JP) .............................. 5-275515

(51) Int. Cl.$^7$ ............................. B23K 11/02
(52) U.S. Cl. ...................... 219/57; 219/101; 228/151; 193/35 SS; 198/782
(58) Field of Search ................ 198/782; 193/35 SS; 228/151; 219/57, 101

(56) References Cited

U.S. PATENT DOCUMENTS

| | | | | |
|---|---|---|---|---|
| 1,728,538 A | * | 9/1929 | Gentil et al. | 198/782 |
| 2,453,401 A | * | 11/1948 | Beeching | 198/782 |
| 3,382,964 A | * | 5/1968 | Bonhoff et al. | 198/782 |
| 3,511,489 A | * | 5/1970 | Field | 198/782 |
| 3,756,436 A | * | 9/1973 | Lingg | 193/35 SS |
| 3,990,570 A | * | 11/1976 | Mercier et al. | 198/782 |
| 4,626,647 A | * | 12/1986 | Takeda et al. | 219/101 |
| 5,270,514 A | * | 12/1993 | Wechselberger et al. | 219/101 |
| 6,164,525 A | * | 12/2000 | Isoyama et al. | 228/212 |

FOREIGN PATENT DOCUMENTS

| | | |
|---|---|---|
| JP | 61159285 | 7/1986 |
| JP | 62234679 | 10/1987 |
| JP | 63090302 | 4/1988 |
| JP | 63160707 | 4/1988 |
| JP | 4351298 | 12/1992 |
| JP | 5104261 | 4/1993 |
| JP | 5277916 | 10/1993 |
| JP | 6106203 | 4/1994 |

* cited by examiner

*Primary Examiner*—Joseph E. Valenza
(74) *Attorney, Agent, or Firm*—Orum & Roth

(57) ABSTRACT

A continuous hot rolling mill with a metal block conveying apparatus and a metal block joining apparatus which moves with the metal blocks along the metal block conveying apparatus to conform a joining operation. The metal block conveying apparatus uses rollers supported by cylinders with a common hydraulic circuit which allows the cylinders to follow guide rails on the metal block joining apparatus and lower out of the path of the metal block joining apparatus and then return to a metal block support position after the metal block joining apparatus' passage without individual control circuits and valves for each of the cylinders.

4 Claims, 24 Drawing Sheets

FIG_1
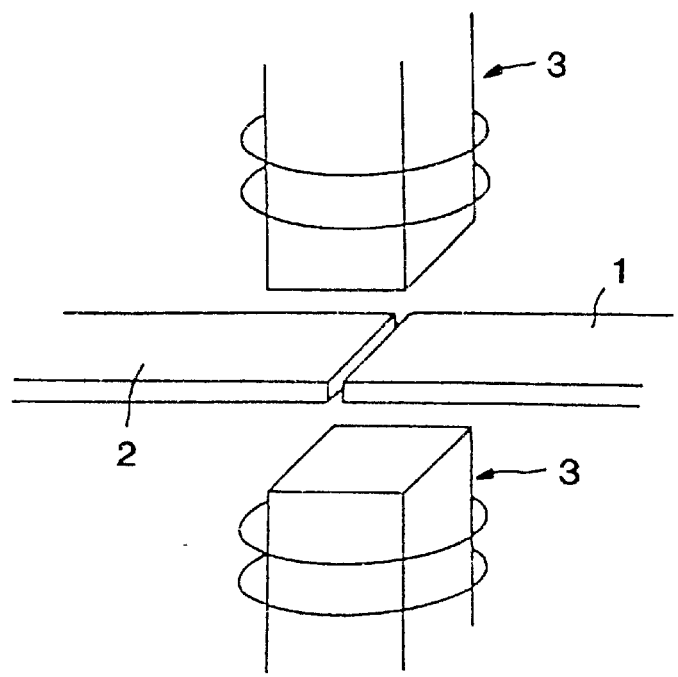
FIG_2
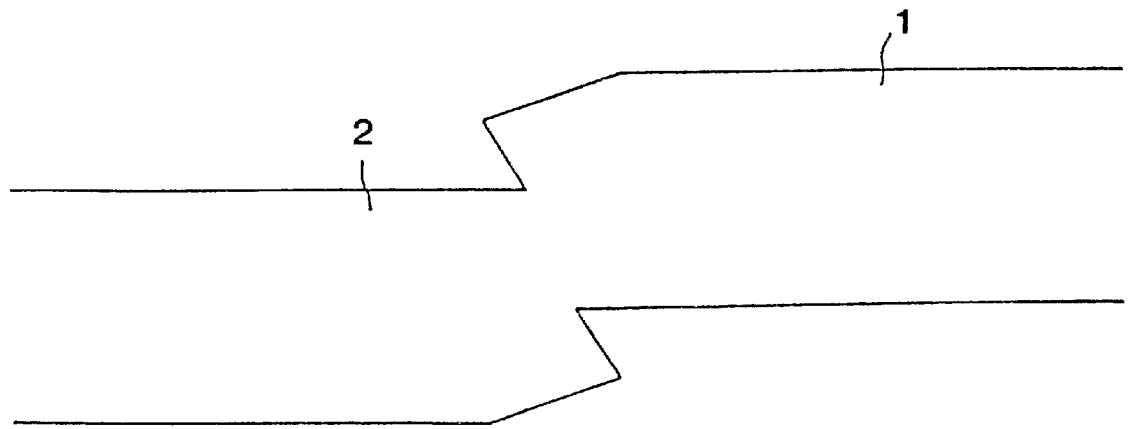

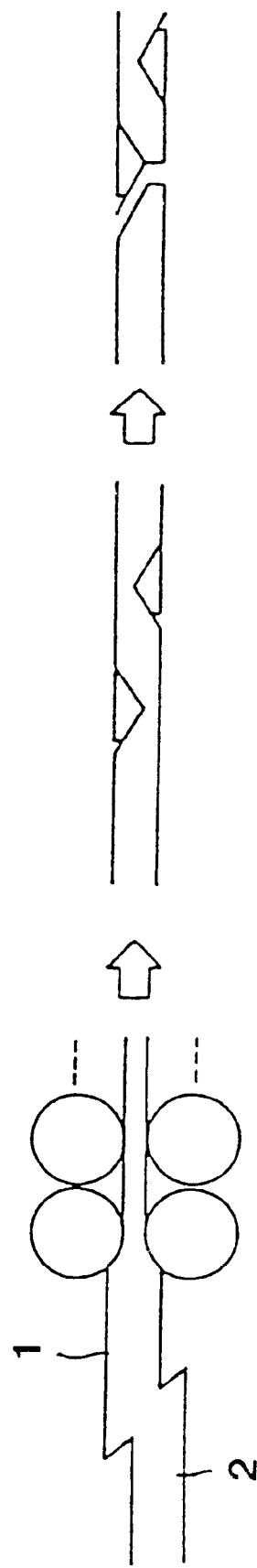

FIG_6
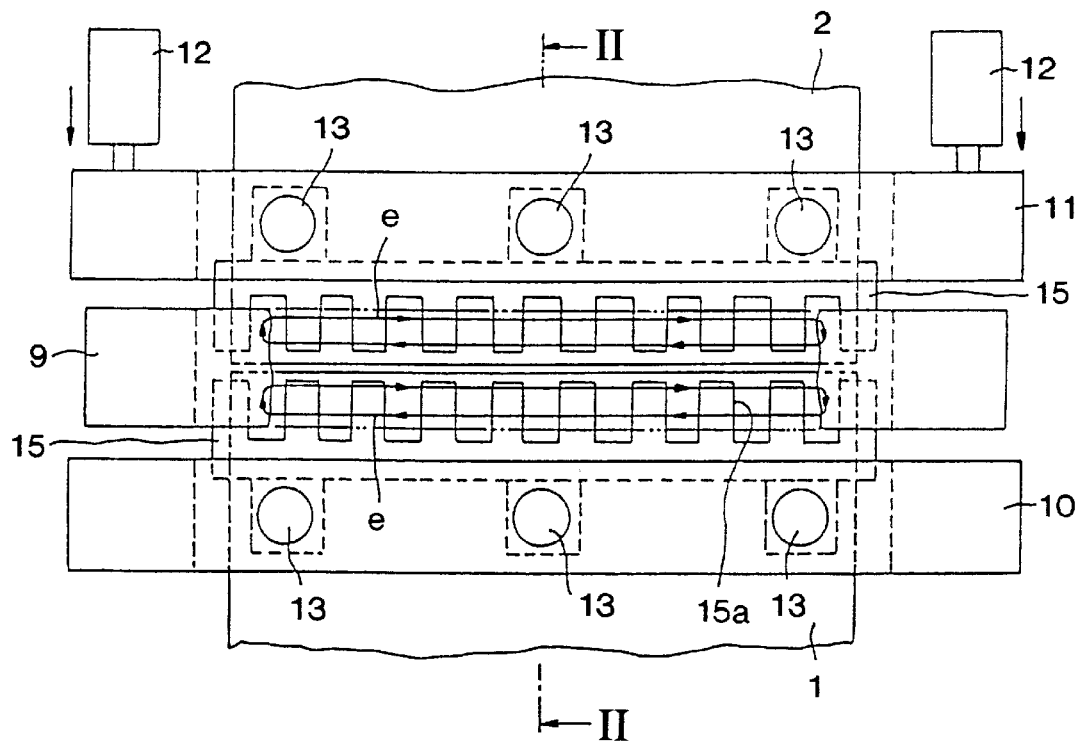
FIG_7
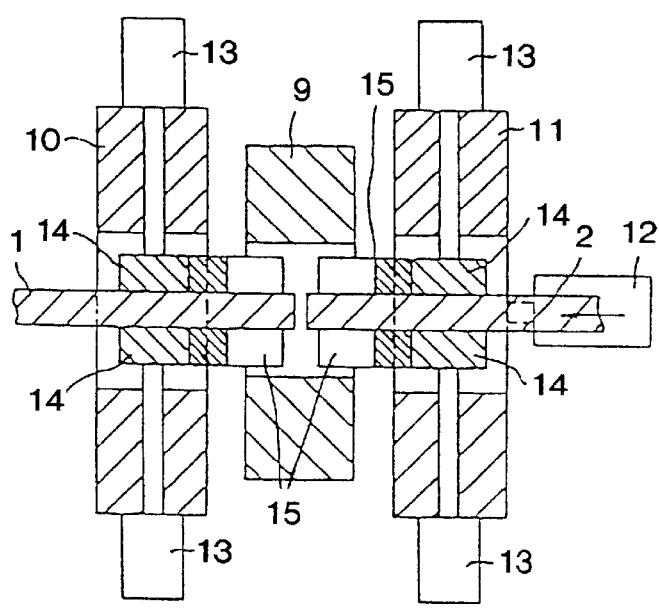

FIG_8
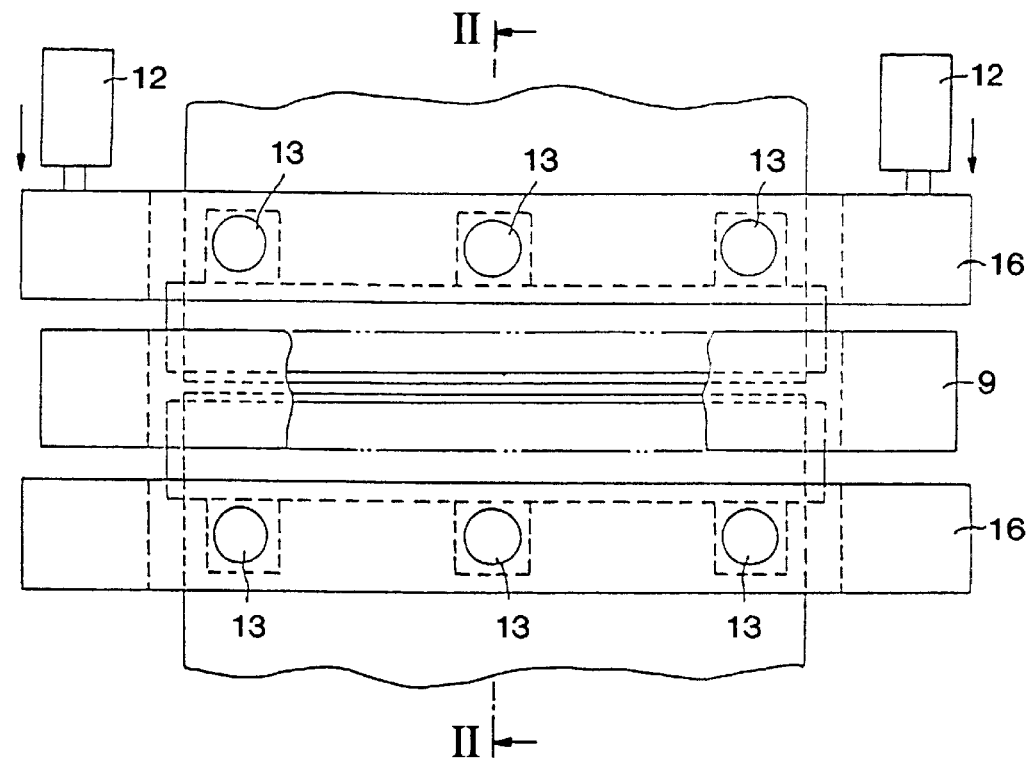
FIG_9
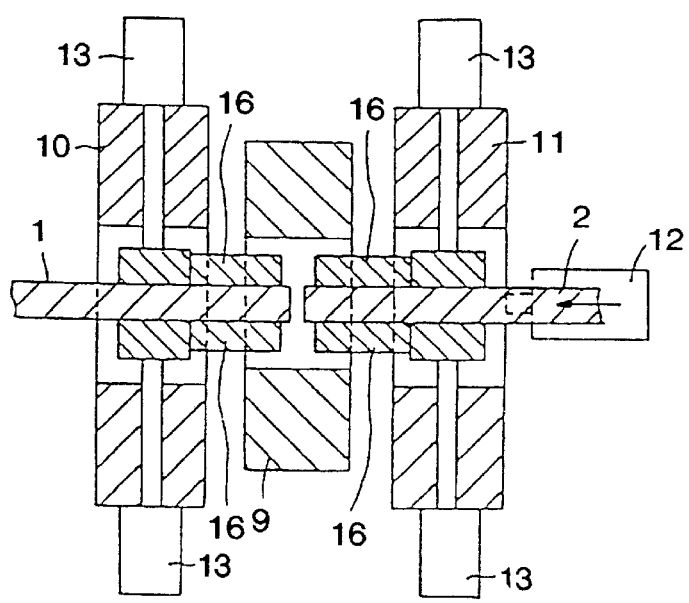

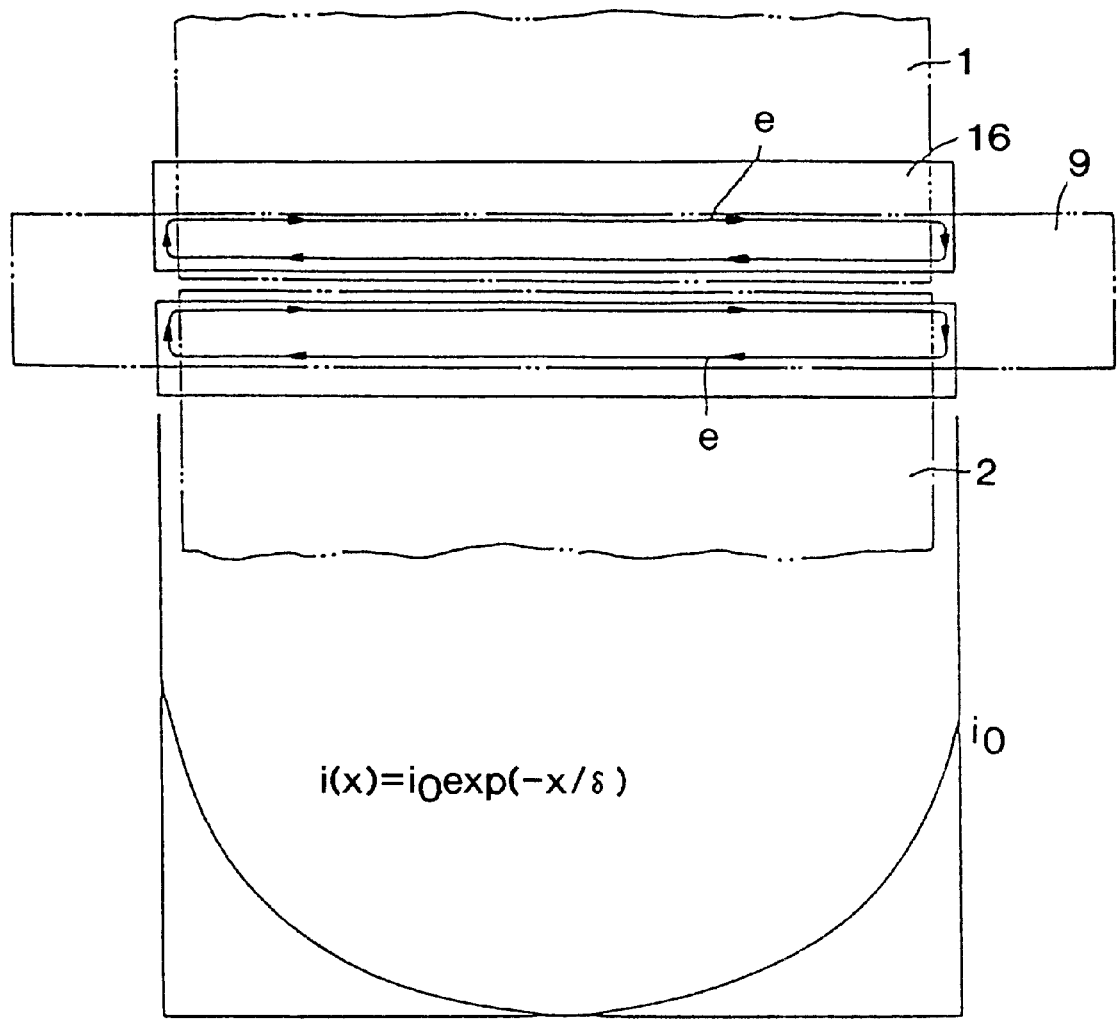

FIG_15A
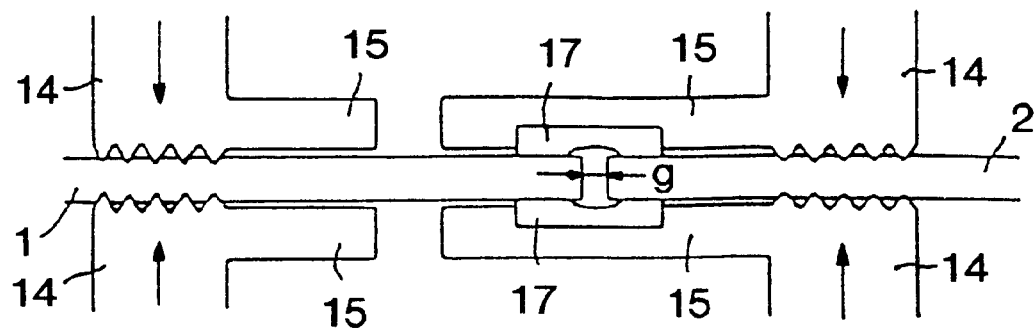
FIG_15B
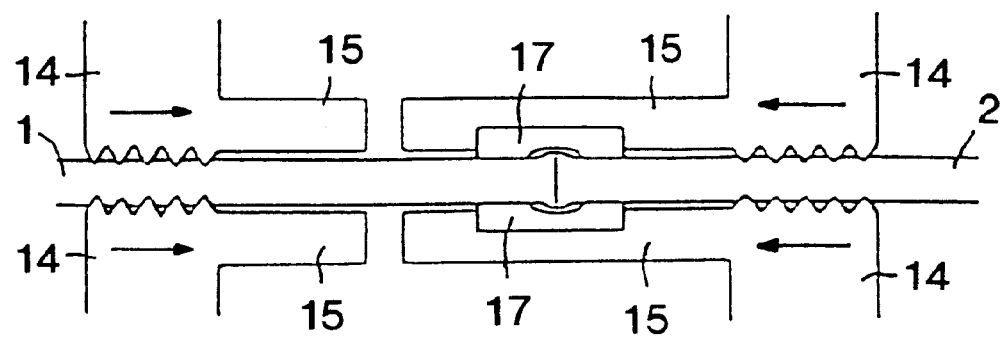
FIG_16
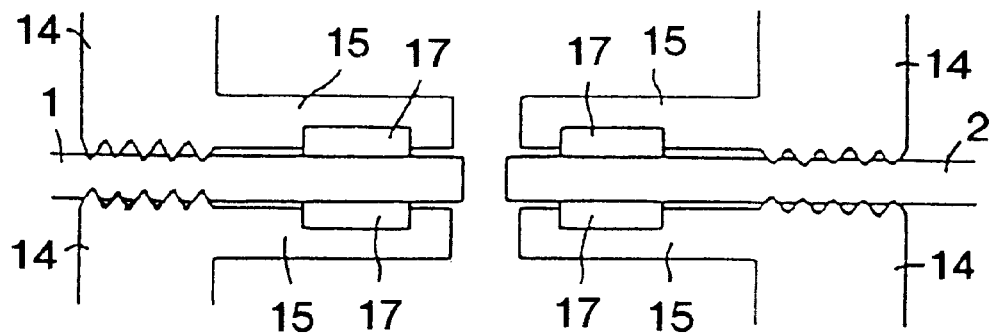

FIG_20
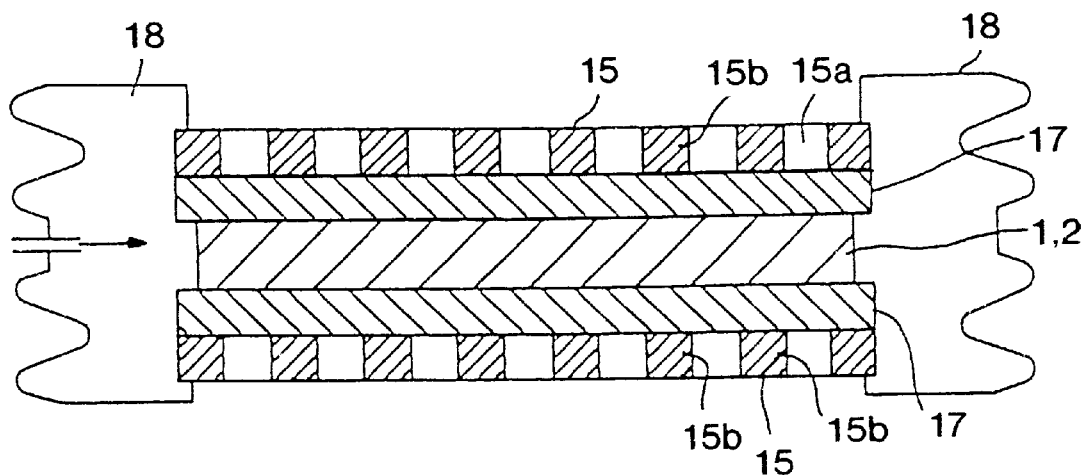
FIG_21
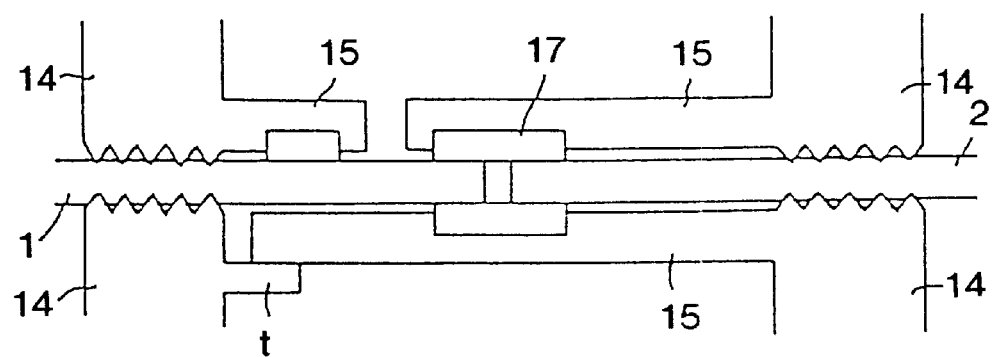

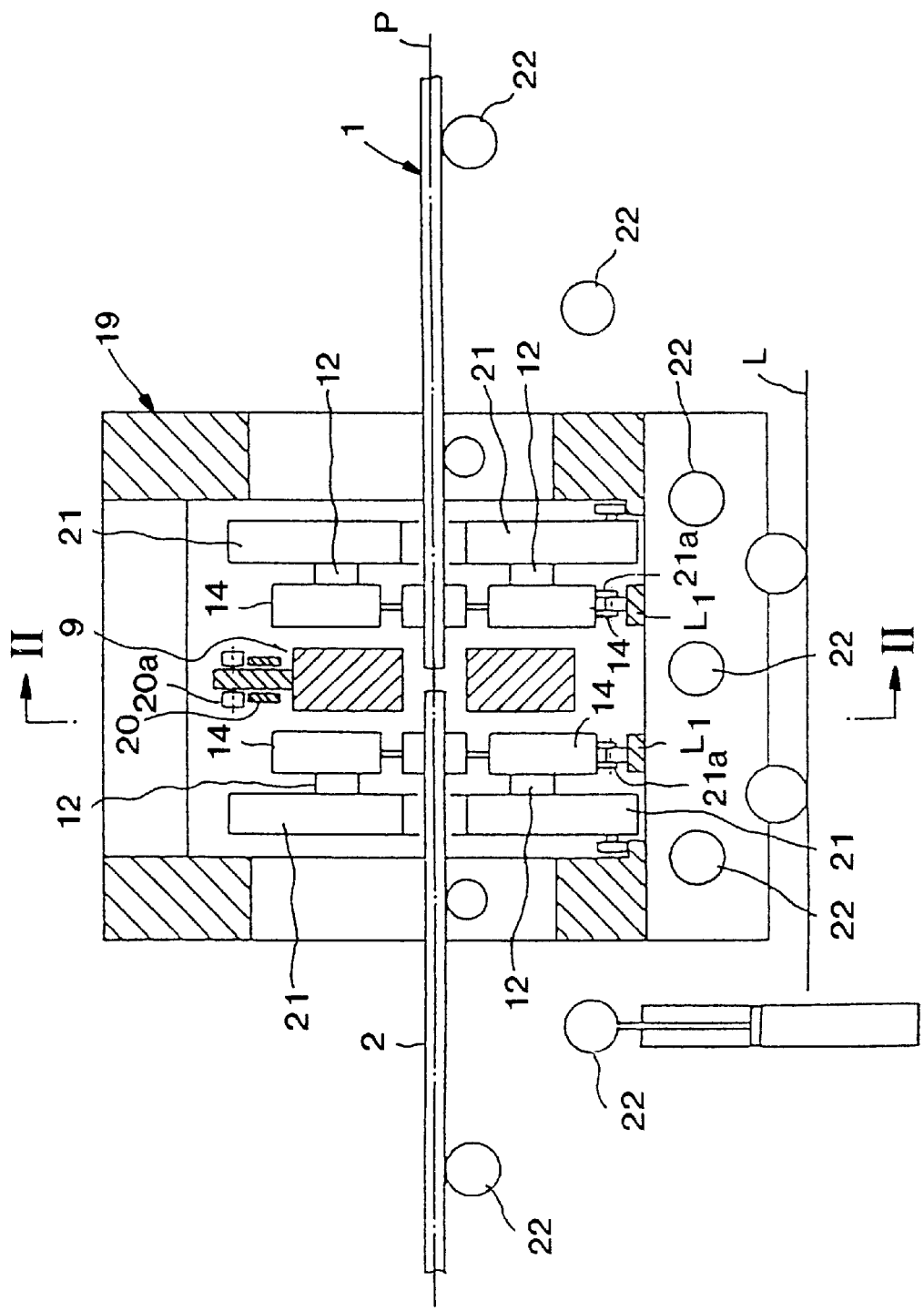

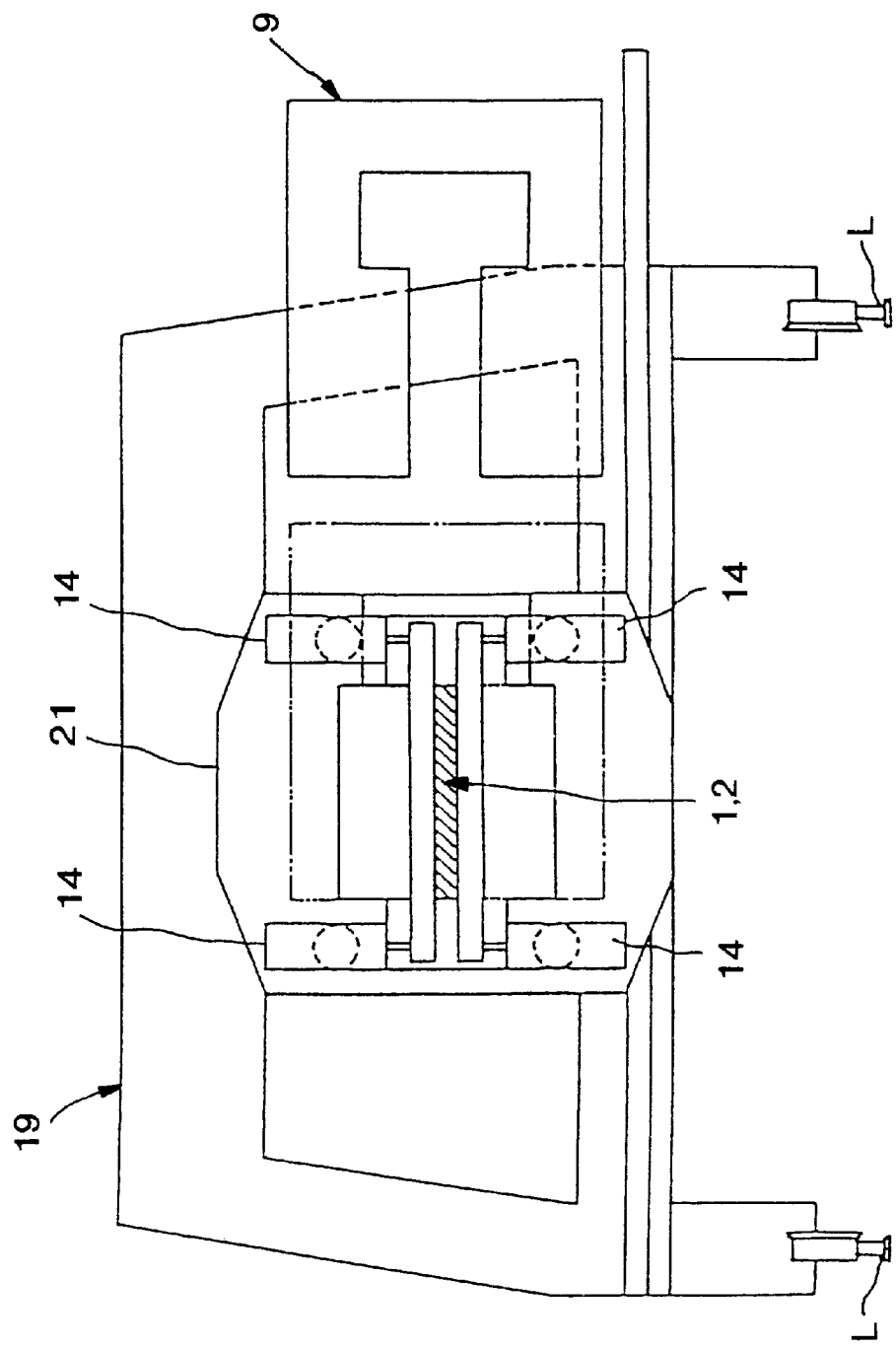

FIG_25
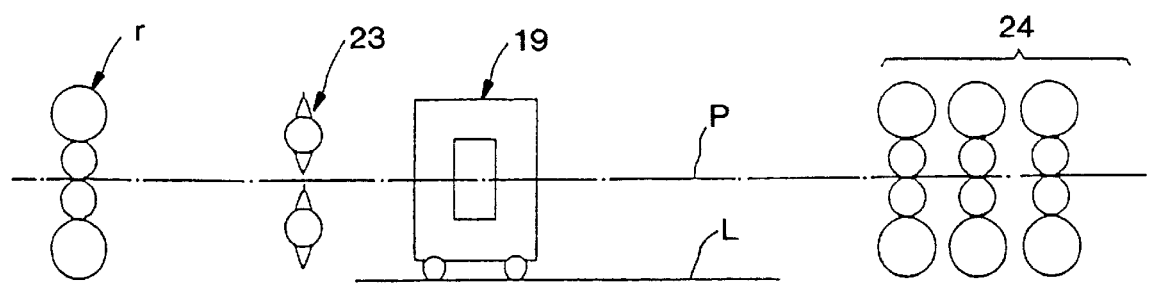
FIG_26
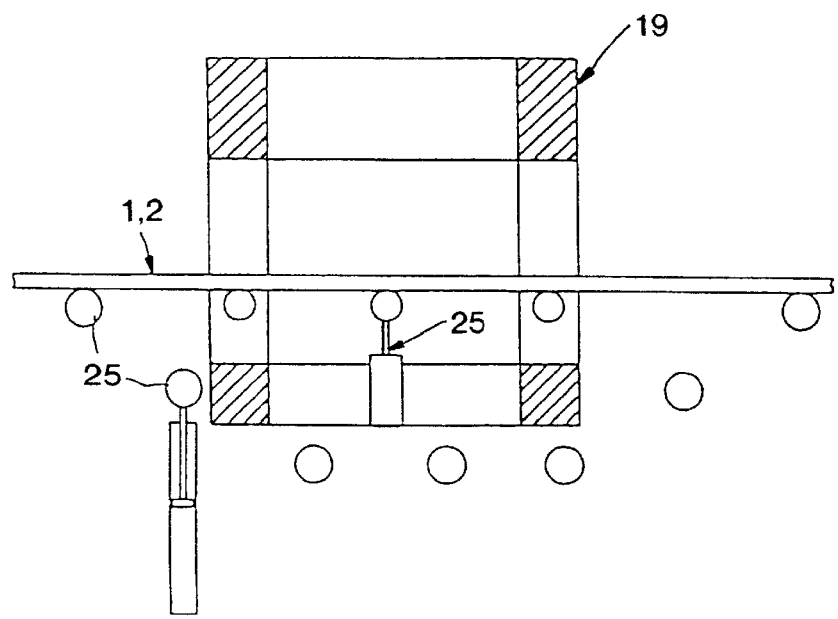

FIG_31
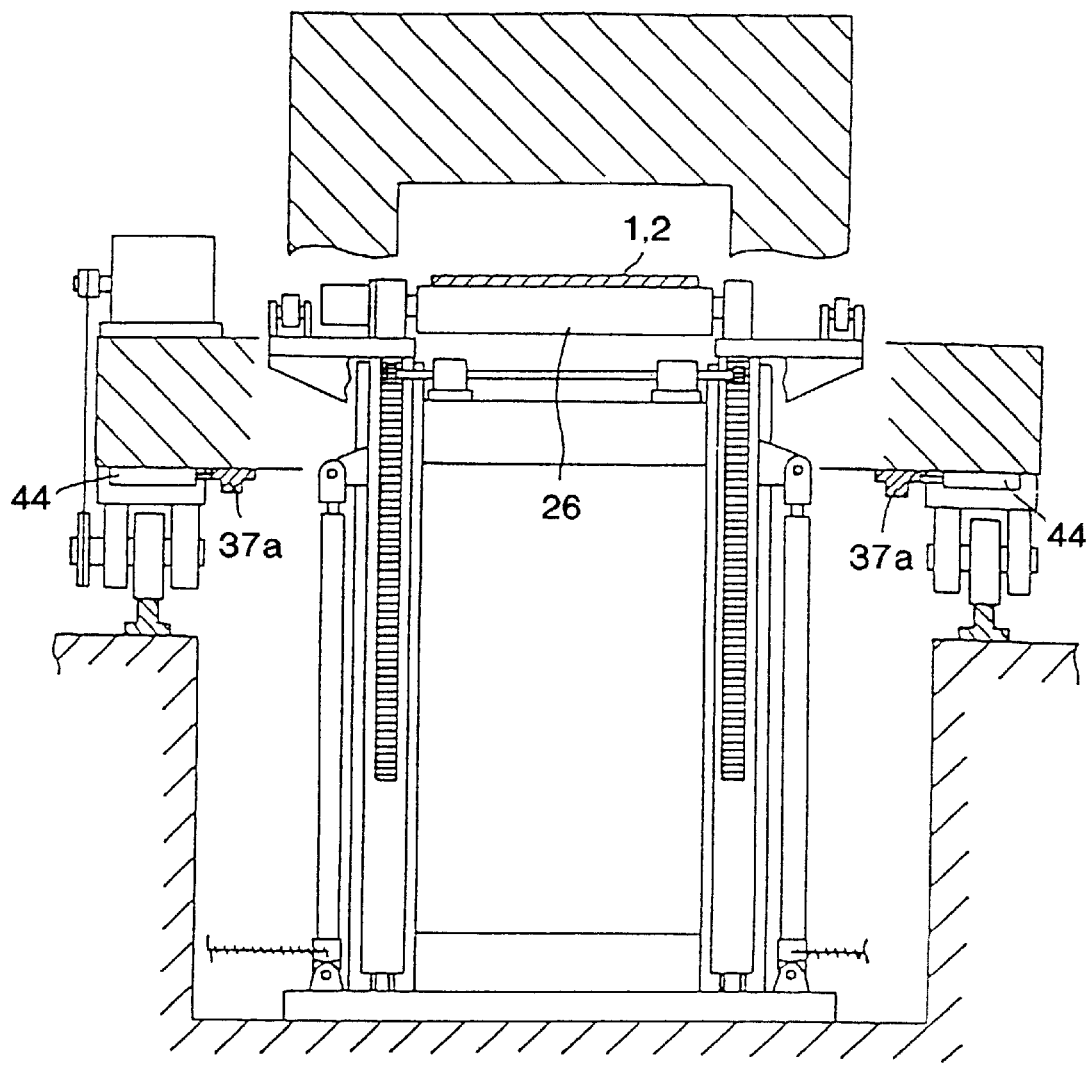

CONTINUOUS HOT ROLLING MILL WITH METAL BLOCK CONVEYING APPARATUS

This appln is a Div of Ser. No. 08/946,638 filed Oct. 7,1997 now U.S. Pat. No. 6,164,525, which is a division of Ser. No. 08/387,788 filed Feb. 15, 1995 U.S. Pat. No. 5,753,894 and a continuation of PCT/JP94/00968 filed Jun. 15, 1994.

TECHNICAL FIELD

The invention relates to a continuous hot rolling method of metal blocks for butt-joining a preceding metal block and a succeeding metal block and continuously performing a hot finish rolling, as well as a metal blocks joining apparatus, a table roller conveyor, a poor joined portion removing apparatus and a metal blocks cooling apparatus which are directly used to carry out such method.

BACKGROUND ART

Conventionally, in hot rolling lines of metal blocks comprised, for example, of steel, aluminum, copper and the like, the metal blocks to be rolled are heated, rough rolled and finish rolled one by one, so as to be finished into a plate having a predetermined thickness. Such a rolling system suffers from disadvantages that a poor threading of the rolled material in the finish rolling inevitably causes the line to stop, and a poor shape of fore end portion and rear end portion of the rolled material results in a low yield.

Therefore, it is a recent trend to carry out an endless rolling in which the metal blocks to be rolled are connected at the fore end and rear end portions thereof prior to the finish rolling and continuously conveyed to the hot rolling line. As prior art in this connection, various proposals are disclosed, for example, in Japanese Patent Application Laid-Open Nos. SHO-58-112601, SHO-60-244401, SHO-61-159285, SHO-61-144203, SHO-62-142082, SHO-62-234679, HEI-4-84609, HEI-4-89120, HEI-5-185109, etc.

According to a general practice, the regions of the metal blocks in the vicinity of their respective end portions are clamped and supported by clamps on the inlet side of the rolling equipment and the to-be-joined portion is heated to an elevated temperature and pressed and joined by heating means as the endless rolling of the metal blocks is performed. However, in joining the metal blocks which are passed through the above-mentioned processes, there still remain various disadvantages such as those described below, in connection with which there have been demands for improvements.

(2) The joining apparatus for joining the metal blocks is generally constructed such that a carriage movable on a conveying line of the metal blocks is provided with clamps for fixing the metal blocks, heating means (e.g., an induction heating coil) for heating the metal blocks to an elevated temperature, and pressing means for pressing the end portions of the metal blocks with each other. In this instance, it has been a general practice to cause the heating means to approach the metal blocks only in the use condition and maintain it off the line except during the heating, and such a practice proved to be free from problems. However, the clamps and the pressing means remain mounted on the carriage and hence located on the conveying line of the metal blocks, so that they are subjected to a substantial thermal load and their lives become relatively short. Moreover, the carriage mounting the clamps and the pressing means cannot be attached with table rollers for structural reasons, so that scratches are formed due to the sliding motion of the metal blocks in the carriage when scales are deposited thereon. Further, the maintenance of the clamps and the pressing means cannot be performed except when the transfer of the metal block is stopped or when the rolling is stopped.

(3) In the rolling line provided with a movable-type joining apparatus suitable for joining the metal blocks during the running, there is required an ascending and descending timing control with which the table rollers supporting the metal blocks are moved vertically corresponding to the running of the joining apparatus. A conventional table roller disclosed, for example, in Japanese Patent Application Laid-Open No. HEI-4-367303 lacks in accuracy and reliability as described below. Also, in connection with the driving cylinders for causing the vertical motion of the table rollers, it has been recognized disadvantageous that the hydraulic apparatus has to be large in scale due to a requirement for substantial flow rate of operating oil, thereby giving rise to substantial increase in the power loss and the running cost.

FIG. 4 shows a construction of the equipment disclosed in the above-mentioned patent, and FIG. 5 shows a control mechanism relating to a vertical motion of the table rollers disposed in such equipment.

In FIG. 4 mentioned above, since the preceding metal block 1 and the succeeding metal block 2 are joined with each other while they are conveyed, the metal blocks joining apparatus 4 first assumes a waiting position on the upstream side (left side in FIG.4) of the conveying line for the metal blocks. And, when the rear end portion of the preceding metal block 1 and the fore end portion of the succeeding metal block 2 reach to the joining apparatus 4, both metal blocks 1, 2 are clamped by pinch rolls P1, P2 disposed on the joining apparatus 4 while the joining apparatus 4 runs at the same speed as the conveying speed of the metal blocks, and the rear end portion of the preceding metal block 1 and the fore end portion of the succeeding metal block 2 are heated and pressed until the joining apparatus 4 reaches a predetermined position on the downstream side of the line to complete the joining. On this occasion, the control unit 5 shown in FIG. 5 detects the position of the joining apparatus 4 to operate driving cylinders 7a–7g through an electromagnetic valve 6, respectively, to cause vertical motion of the respective movable table rollers 8a–8g for preventing them from colliding against the joining apparatus 4. In the equipment constructed as above, there is required a control by which the table rollers positioned in front of the joining apparatus 4 are descended when the joining apparatus 4 reaches thereto and the table rollers are ascended immediately after the joining apparatus 4 has passed therethrough. However, there is a problem relating the accuracy and reliability of the electromagnetic valve 6 for performing the control and the vertical motions of the table rollers, so that the joining apparatus 4 and the table rollers 8a–8g may collide against each other. Also, in connection with the driving cylinders 7a–7g for causing the vertical motion of the table rollers 8a–8g, it has been recognized disadvantageous that the hydraulic apparatus has to be large in scale due to a requirement for substantial flow rate of operating oil, and such apparatus has to be continuously operated thereby giving rise to substantial increase in the power loss and the running cost.

DISCLOSURE OF THE INVENTION

It is an object to provide a novel method for dissolving all of the conventional various problems in connection with implementation of a continuous hot rolling, and various apparatuses which are used directly for carrying out said method.

The various problems described above as the tasks of the invention can be advantageously attained by the constituent features described below.

Specifically, the invention provides a continuous hot rolling method comprising the steps of cutting a rear end portion of a preceding metal block and a fore end portion of a succeeding metal block, respectively, heating and pressing the metal blocks to each other and thereby joining them with each other, and subsequently performing a finish rolling, wherein the method further comprises the step of restraining a region of each of the metal blocks extending from a clamping position to the end portion thereof for preventing a level change of the metal blocks upon heating and pressing the metal blocks (the first invention)

The invention further provides a continuous hot rolling method comprising the steps of cutting a rear end portion of a preceding metal block and a fore end portion of a succeeding metal block, respectively, heating and pressing the metal blocks to each other thereby joining them with each other, and subsequently performing a finish rolling, wherein the method further comprises the step of restraining a region of each of the metal blocks passed by a magnetic flux and extending from a clamping position to the end portion thereof, by means of a plurality of holding members, for preventing a level change of the metal blocks upon heating and pressing the metal blocks by an induction heating coil, said holding members being arranged spaced apart from each other on surfaces of the metal blocks and having a width which is not greater than five times of a penetration depth of an induced current by the heating coil (the second invention).

The invention further provides a continuous hot rolling method comprising cutting a rear end portion of a preceding metal block and a fore end portion of a succeeding metal block, respectively, heating and pressing the metal blocks to each other and thereby joining them with each other, and subsequently performing a finish rolling, wherein the method further comprises the step of arranging a plurality of holding members on a magnetic flux passing region of each of the metal blocks extending from a clamping position to the end portion thereof, for preventing a level change of the metal blocks upon heating and pressing the metal blocks by an induction heating coil, the holding members being arranged spaced apart from each other on surfaces of the metal blocks and each having a width which is not greater than five times of a penetration depth of an induced current by the heating coil, thereby restraining the metal blocks while maintaining an insulating state between the holding members and the metal blocks (the third invention). In this instance, it is preferable to perform the joining while blowing at least one of non-oxidizing gas and reducing gas onto a to-be-joined face and a joined portion of the metal block.

The invention further provides a continuous hot rolling method comprising cutting a rear end portion of a preceding metal block and a fore end portion of a succeeding metal block, respectively, heating and pressing the metal blocks to each other and thereby joining them with each other, and subsequently performing a finish rolling, wherein the method further comprises the step, upon joining the metal blocks by a movable joining apparatus, of escaping downwardly those table rollers for conveying the respective metal blocks, which are situated in a region below the movable joining apparatus, and returning the table rollers to an initial level in a conveying region of the respective metal blocks (the fourth invention).

The invention further provides a continuous hot rolling method comprising cutting a rear end portion of a preceding metal block and a fore end portion of a succeeding metal block, respectively, heating and pressing the metal blocks to each other and thereby joining them with each other, and subsequently performing a finish rolling, wherein the method further comprises the step of shaving off a poor joined portion from a surface of a base plate by a predetermined depth, upon removal of the poor joined portion of the metal blocks formed by pressing (the fifth invention). In this instance, it is preferable to control a rotating cutter upon shaving off the poor joined portion, such that a circumferential speed thereof is 50–120 m/s.

The invention further provides a continuous hot rolling method comprising cutting a rear end portion of a preceding metal block and a fore end portion of a succeeding metal block, respectively, heating and pressing the metal blocks to each other and thereby joining them with each other, and subsequently performing a finish rolling, wherein the method further comprises the step of cooling the joined portion after joining the metal blocks and before and/or after removing the poor joined portion (the sixth invention).

The invention further provides a metal block joining apparatus in a continuous hot rolling, which comprises heating means for heating the metal blocks to an elevated temperature, clamps having seizing portions which protrude toward the end portion of the metal block for clamping a preceding metal block and a succeeding metal block one above the other, and pressing means for moving and pressing at least one of the preceding metal block and the succeeding metal block toward the other of the metal blocks (the seventh invention).

The invention further provides a metal block joining apparatus in a continuous hot rolling, which comprises induction heating coil for heating the metal blocks to an elevated temperature, clamps for clamping and restraining a preceding metal block and a succeeding metal block one above the other, and pressing means for moving and pressing at least one of the preceding metal block and the succeeding metal block toward the other of the metal blocks, each of the clamps having a notch portion notched in a comb-like manner at regular intervals along a widthwise direction of the metal block in a magnet flux region of a seizing portion which protrudes form a clamping and supporting portion of the metal block toward an end portion thereof (the eighth invention).

The invention further provides a metal block joining apparatus in a continuous hot rolling, which comprises induction heating coils for heating the metal blocks to an elevated temperature, clamps for clamping and restraining a preceding metal block and a succeeding metal block one above the other, and pressing means for moving and pressing at least one of the preceding metal block and the succeeding metal block toward the other of the metal block, at least one of the clamps having a notch portion notched in comb-like manners at regular intervals in a widthwise direction of the metal block, and an insulation material bridged between the metal blocks in a region over both of the metal blocks (the ninth invention). In this instance, it is preferable to provide the clamp with a nozzle for blowing at least one kind of an non-oxidizing gas and a reducing gas onto a to-be-joined face and a joined portion of the metal blocks.

The invention further provides a metal block joining apparatus in a continuous hot rolling, which comprises heating means for metal blocks, clamps for clamping and restraining a preceding metal block and a succeeding metal block one above the other to thereby align levels of the metal blocks, and pressing means for moving and pressing at least one of the preceding metal block and the succeeding metal block toward the other of the metal blocks, moving means for moving each of said means between an on-line position and an off-line position, and vertically movable table rollers for supporting the metal block at a region where each of the means by the moving means have been moved to the off-line position (the tenth invention).

The invention further provides a metal block conveying table roller conveyor in a continuous hot rolling, which comprises a plurality of table rollers for supporting the metal blocks at a plurality of positions along a longitudinal direction thereof, cylinders arranged below and supporting the respective table rollers, and a hydraulic circuit including a hydraulic pipe which communicates cylinder heads with each other, for maintaining an inner pressure of each of the cylinder heads at a constant pressure (the eleventh invention).

According to the invention, a region of the metal blocks extending from a position fixed by the clamps to the end portion thereof is restrained for preventing the end portion from deformation upon heating of the metal blocks to an elevated temperature, and thereby restricting a vertical movement thereof. It is thus possible to avoid joining of the metal blocks which have been dislocated relative to each other, and prevent occurrence of bucklings (the first to third inventions and the seventh to ninth inventions).

According to the invention, furthermore, the clamps, the heating means and the pressing means constituting the joining apparatus are individually movable so that it is possible to decrease the thermal load applied to such means and extend the life of the apparatus (the tenth invention).

According to the invention, furthermore, the table rollers for conveying the metal blocks are forced to escape to a position below the joining apparatus upon arrival thereof, and to return to the metal blocks conveying region immediately after passage of the joining apparatus. Therefore, a complicated control is not required in connection with the vertical motion of the table rollers for positively preventing collision of the table rollers against the joining apparatus, and it is possible to simplify the apparatus (the fourth and eleventh inventions).

BRIEF DESCRIPTION OF THE DRAWINGS

FIG. 1 is a view showing a state in which a preceding metal block and a succeeding metal block are heated to an elevated temperature by an induction heating coil.

FIG. 2 is a view showing a state in which the preceding metal block and the succeeding metal block are joined.

FIG. 3 is a view showing a state in which the joined metal blocks are broken during the hot rolling.

FIG. 6 is a view explaining the structure of the metal blocks joining apparatus.

FIG. 7 is a sectional view taken along the line II—II of FIG. 6.

FIG. 8 is a view showing the structure of the metal blocks joining apparatus.

FIG. 9 is a sectional view taken along the line II—II of FIG. 8.

FIG. 10 is a view showing a state in which the metal blocks are heated when they are joined to each other.

FIGS. 15(a) and 15(b) are views showing states in which the metal blocks are joined to each other.

FIG. 16 is a view showing the structure of the joining apparatus according to another embodiment.

FIG. 20 is a view showing the structure of the joining apparatus according to another embodiment.

FIG. 21 is a view showing the structure of the joining apparatus according to another embodiment.

FIG. 22 is a view showing the structure of the joining apparatus in which t he clamps, pressing means and heating means are individually movable.

FIG. 23 is a sectional view taken along the line II—II of FIG. 22.

FIG. 25 is a view showing one embodiment of the continuous hot rolling equipment provided with the joining apparatuses shown in FIG. 22 to FIG. 24.

FIG. 26 is a view showing one example of use of the joining apparatus shown in FIG. 22.

FIG. 31 is a view explaining a state in which the table roller conveyor shown in FIG. 29 is operated.

BEST MODE FOR CARRYING OUT THE INVENTION

Figure 4:
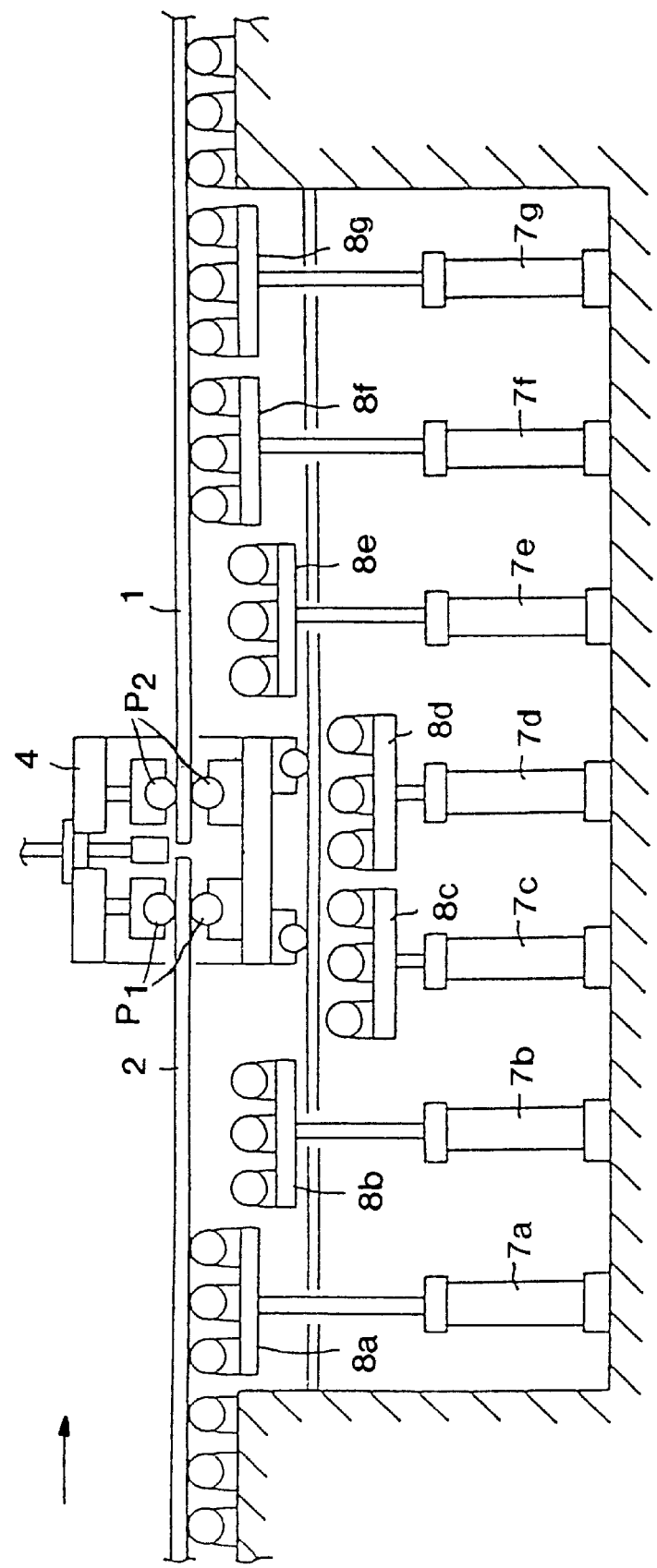
FIG. 4 is a view explaining the structure of a conventional table roller conveyor for conveying the metal blocks.
Figure 5:
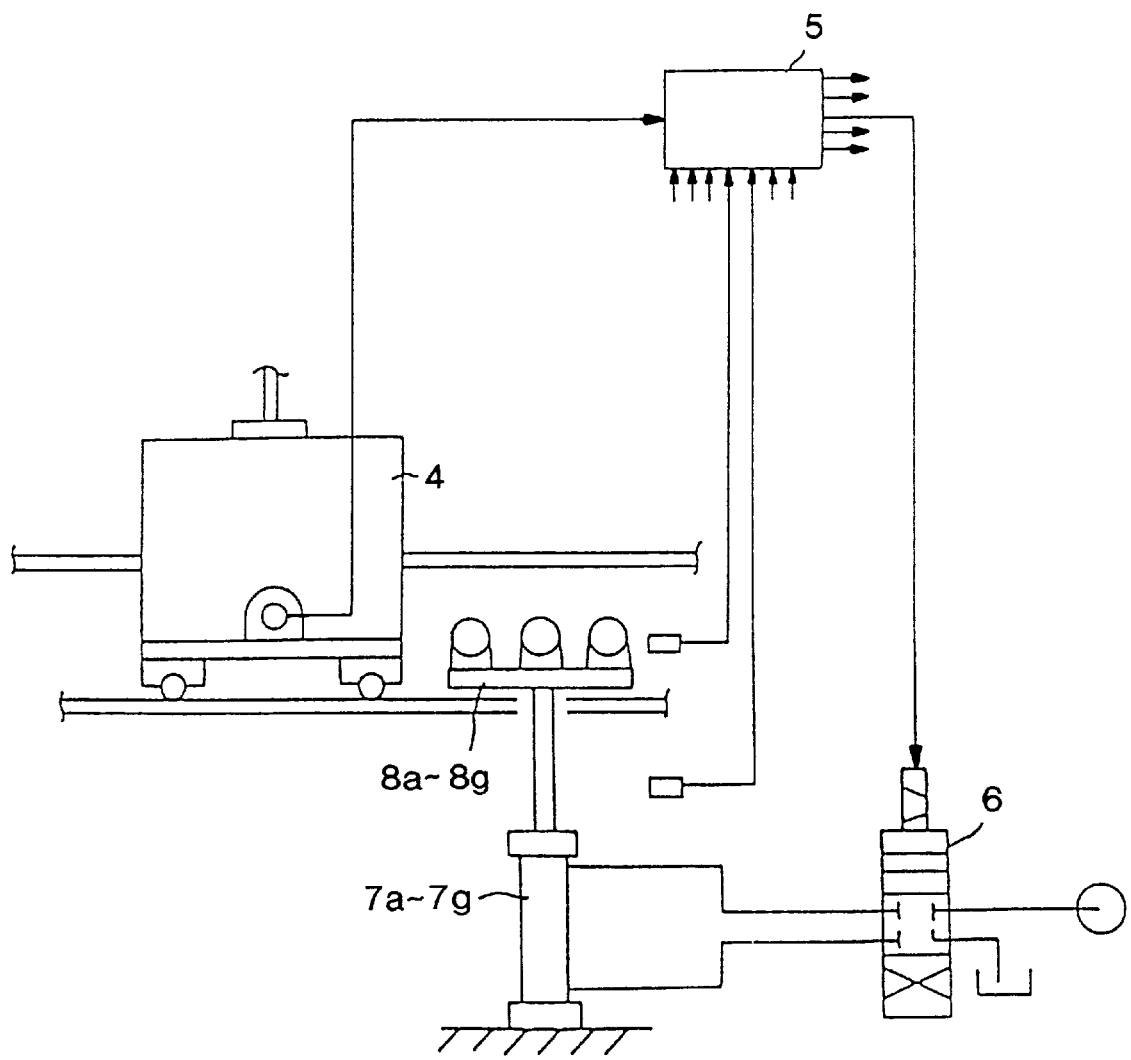
FIG. 5 is a view showing a mechanism for controlling the vertical motion of the table rollers shown in FIG. 4.

The invention will be explained in detail hereinafter with reference to the drawings.

FIG. 6 shows the structure of the metal blocks joining apparatus, and FIG. 7 shows the sectional view taken along the line II—II of FIG. 6.

In FIG. 6 and FIG. 7, reference numeral 9 denotes an induction heating coil for heating an end portion of the metal block to an elevated temperature, which is arranged in such a manner that a preceding metal block 1 and a succeeding metal block 2 are passed through the center space portion thereof. Reference numeral 10 denotes an outlet frame which is arranged on the outlet side of the induction heating coil 9 in such a manner that the preceding metal block 1 and the succeeding metal block 2 can be passed through the center space portion thereof. Reference numeral 11 denotes an inlet frame which is provided with hydraulic cylinders 12 as means for pressing the metal blocks, and which is arranged on the inlet side of the heating means 9 in such a manner that the preceding metal block 1 and the succeeding metal block 2 can be passed through a center space portion thereof.

Hydraulic cylinders 13 are disposed on the upper portion and the lower portion of each of the inlet and outlet frames 10, 11 such that their respective rod portions extend therethrough. Each hydraulic cylinder 13 is provided at the leading end of the rod portion thereof with a clamp 14 for clamping an end portion of the metal block from above and below to thereby fixedly hold it.

Reference numeral 15 denotes a seizing portion for restraining a region extending from a position of the clamp 14 to the end portion of the metal block in order to prevent a level change, in the vertical direction, of the metal blocks upon pressing the metal blocks. The seizing portion 15 has a notch portion 15*a* notched in a comb-like manner at regular intervals along a widthwise direction of the metal block, and is mounted on each of the upper and lower clamps 14 which are attached to the leading ends of the rod portions of the hydraulic cylinders 13.

The preceding metal block 1 and the succeeding metal block 2 are arranged opposite to each other leaving a minute clearance therebetween, and pressed against each other with the clamp 14 and the seizing portion 15 by means of the hydraulic cylinders 12 so that they are restrained from above and, below. In this state, the preceding metal block 1 and the succeeding metal block 2 are applied with an alternate magnetic field by the induction heating coil 9 and thereby heated to an elevated temperature, and both of the metal blocks are pressed by operating the hydraulic cylinders 12, so that the metal blocks can be joined positively and in a short time without causing vertical dislocation and buckling of the metal blocks.

In this instance, a high frequency current is supplied to the induction heating coil 9 such that an alternating magnetic field is applied to the metal blocks to penetrate therethrough in the thickness direction and an induced current "e" is caused to flow on a plane of the metal blocks whereby they are heated to an elevated temperature in a short time.

The current density of the induced current "e" generated on such occasion has a distribution with reference to the end portion of the plate, which is represented by the following equation.

$i(x) = i_O \exp(-x/\delta)$ x: the distance from the end portion of the plate
δ: the penetrating depth of the induced current
Here, δ is defined by $$\frac{1}{2\pi}\sqrt{(\rho \times 10^7)/(\mu \cdot f)}$$

f: frequency of the alternating magnetic field (Hz)
ρ: specific resistance (Ω·m)
μ: relative permeability (−)

When thus constructed joining apparatus is provided with a seizing portion 16 shown in FIG. 8 and FIG. 9 for restraining the metal block over the whole region in the widthwise direction thereof, instead of the seizing portion 15 of the clamp 14, a similar effect can be achieved. However, when the induction coil is used particularly as the heating means in the apparatus including such a seizing portion 16, the induced current "e" is caused to flow on the seizing portion 16 as shown in FIG. 10, so that the seizing portion 16 is heated to an elevated temperature together with the metal blocks 1, 2, thereby lowering the heating efficiency and causing the seizing portion 16 to be melted and welded to the metal blocks.

Therefore, in the joining apparatus provided with the clamps 14 having the seizing portion 16 shown in FIG. 8 and FIG. 9 mentioned above, it is preferable to incorporate a heating means using gas, torch, laser and the like is.

Figure 11A:
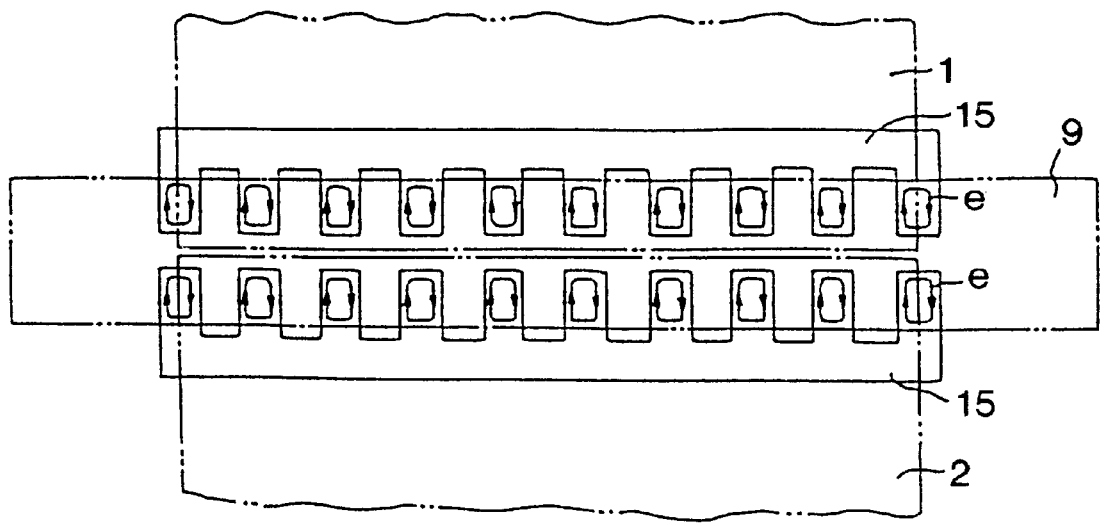
FIGS. 11(a) and 11(b) are views showing states in which the metal blocks are heated when they are joined to each other.
Figure 11B:
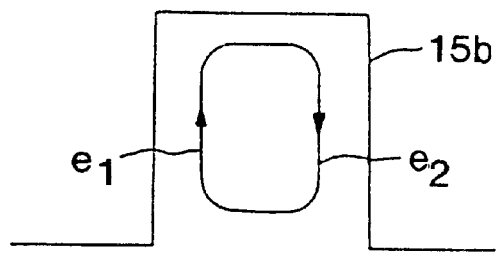
Figure 11C:
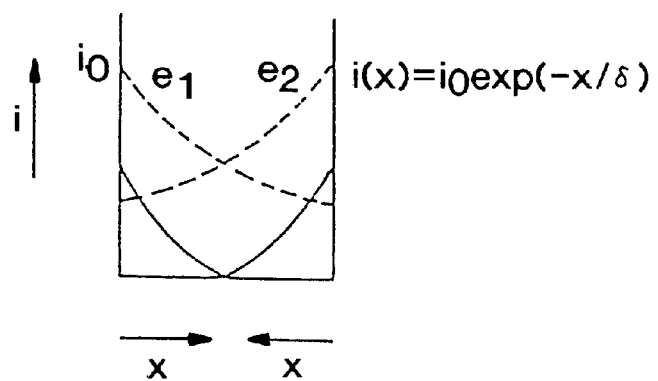
FIG. 11(c) is a graph of current density.

Upon heating the metal blocks, an induced current is caused to flow in the seizing portion 15 constructed as shown in FIG. 6 and FIG. 7 mentioned above. By forming notch portions 15*a* in a comb-like manner at regular intervals along the widthwise direction of the metal blocks, the induced current "e" in the comb teeth 15*b* becomes a circulating current, as shown in FIGS. 11*a* and 11*b*. Apparent induced currents $e_1$ and $e_2$ shown by dotted lines in FIG. 11*c* which illustrates a major part of the seizing portion 15, are opposite in direction to each other and interact to cancel each other. Thus, as FIG. 11*c* shows, an actual current density is decreased as shown by the solid line, and generation of Joule's heat is reduced and the magnitude of heating becomes small. Therefore, the heating efficiency upon joining can be advantageously improved. In this connection, it should be noted that the induced current flows on the end surface of the metal block due to the skin effect. Moreover, melting of the seizing portion 15 and welding to the plate member are prevented.

It is desirable to make the width of each of the comb teeth 15*b* in the seizing portion 15 as the holding member within two times (but not zero) of the penetrating depth of the induced current, from the viewpoint of loss upon heating, though they are advantageously greater in width from the viewpoint of strength and rigidity. The width of the comb tooth 15*b* can be made up to about five times of the penetration depth, by performing cooling and the like. Of course, according to the invention, cooling may be performed in combination with the comb teeth whose width is not greater than two times of the penetrating depth.

Figure 12:
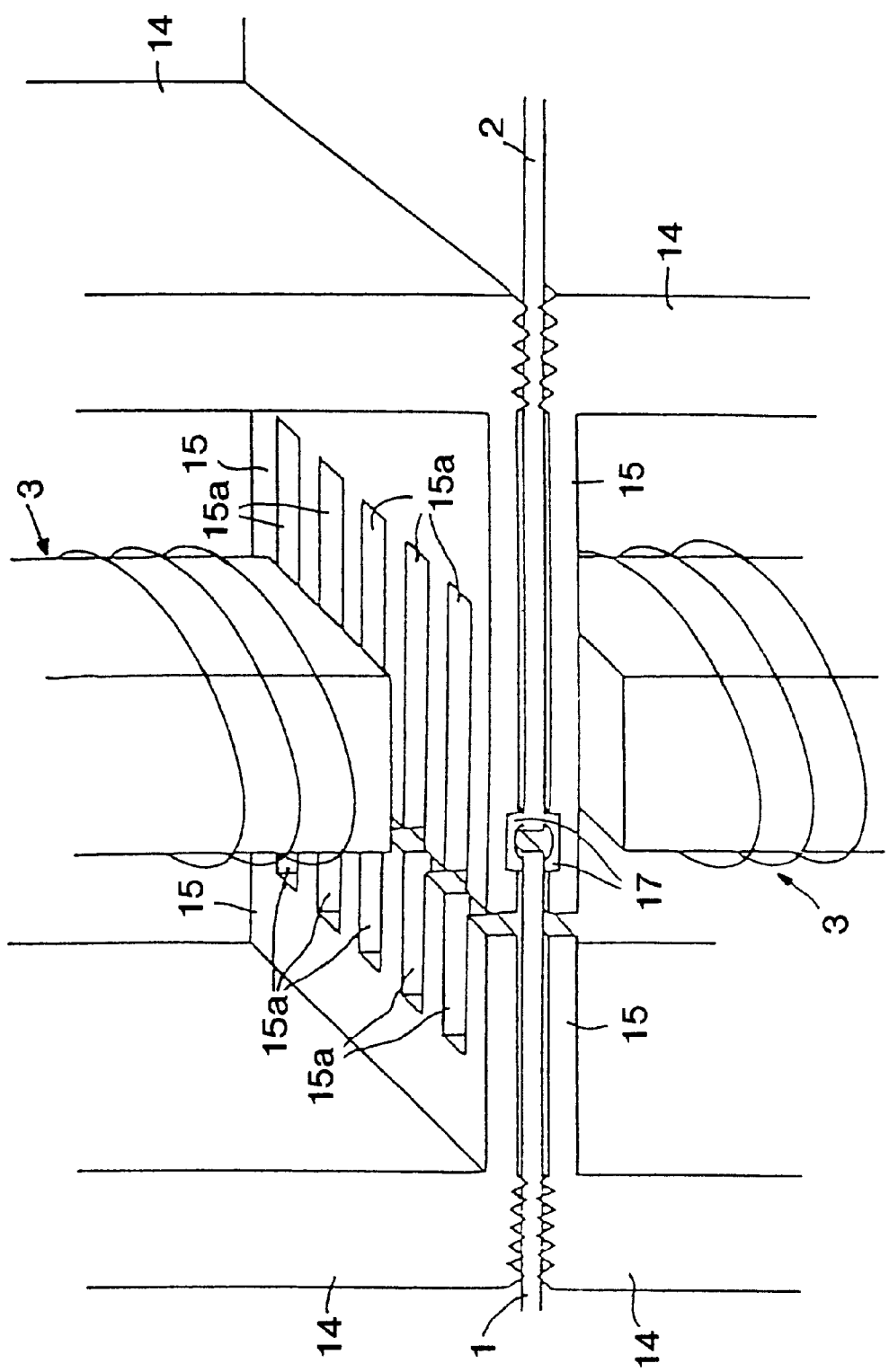
FIG. 12 is a view showing the structure of the metal blocks joining apparatus.

FIG. 12 shows another embodiment of the joining apparatus according to the invention, in which one set of the seizing portions 15 of the clamps 14 is made to have such a length as to extend over the preceding metal block 1 and the succeeding metal block 2, and provided with an insulation material 17 in that region which extends over both of the metal blocks at the seizing portion 15, that is, between the metal blocks.

Hydraulic cylinders or the like driving means (not shown) are connected to the clamps 14 for clamping the preceding metal block 1 and the succeeding metal block 2 one above the other and thereby restraining them. The driving means are vertically movable toward and away from each other. The seizing portions 15 may be constituted by SUS304, titanium, tungsten and the like, and are connected to the clamps 14 for preventing the end portions of the metal blocks from being joined to each other with a vertical dislocation as the metal blocks are pressed to each other, and also for preventing occurrence of bucklings. Each of the seizing portions is provided with a notch portion 15*a* that is notched in a comb-like manner at regular intervals along the widthwise direction of the metal block, and also with an insulating material 17. Since the end portions of the metal blocks are heated to high temperature and may be partly melted, the insulating material comprises a ceramic and the like material having sufficient heat resistance, heat impact resistance and high-temperature strength.

Figure 13:
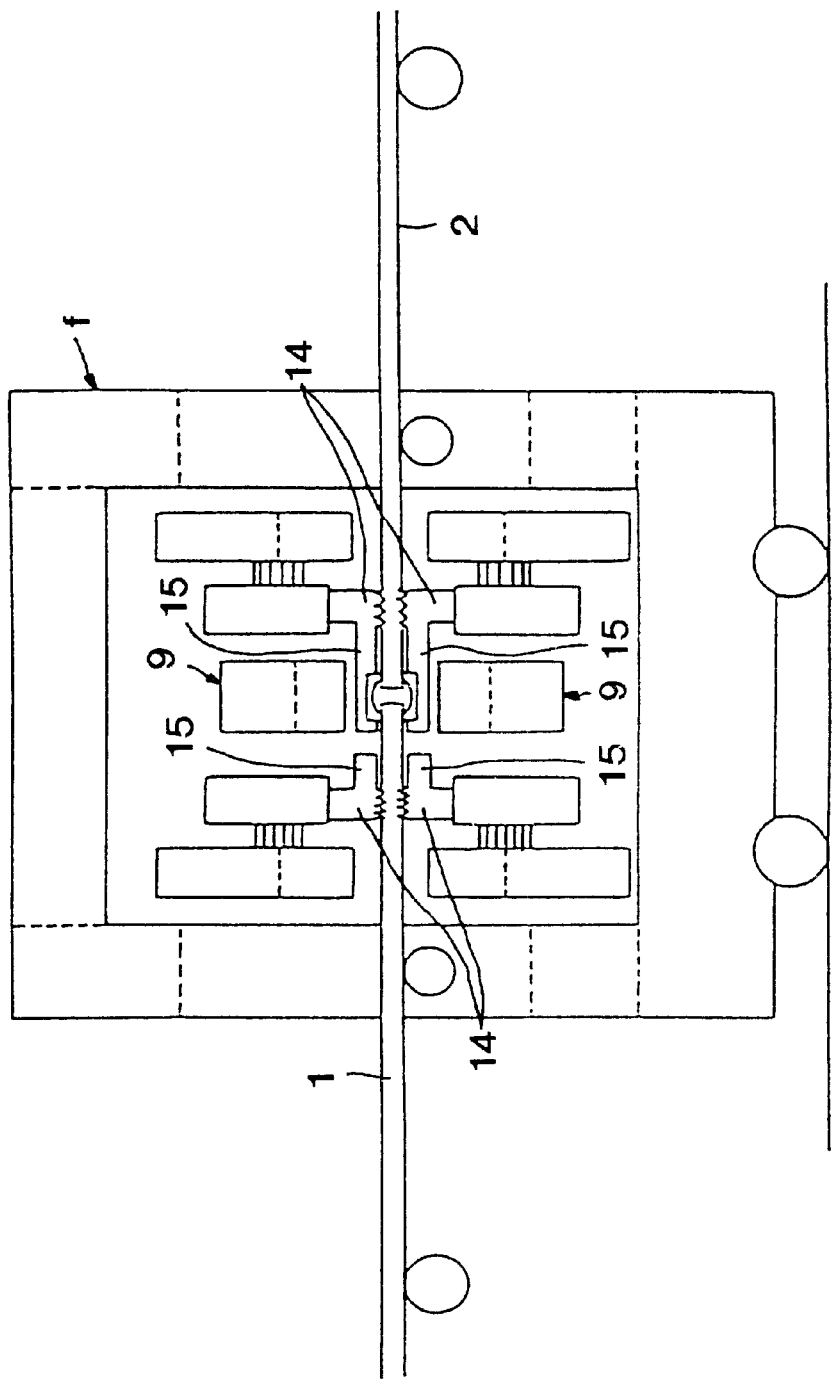
FIG. 13 is a view showing the entire structure of the apparatus shown in FIG. 12.
Figure 14:
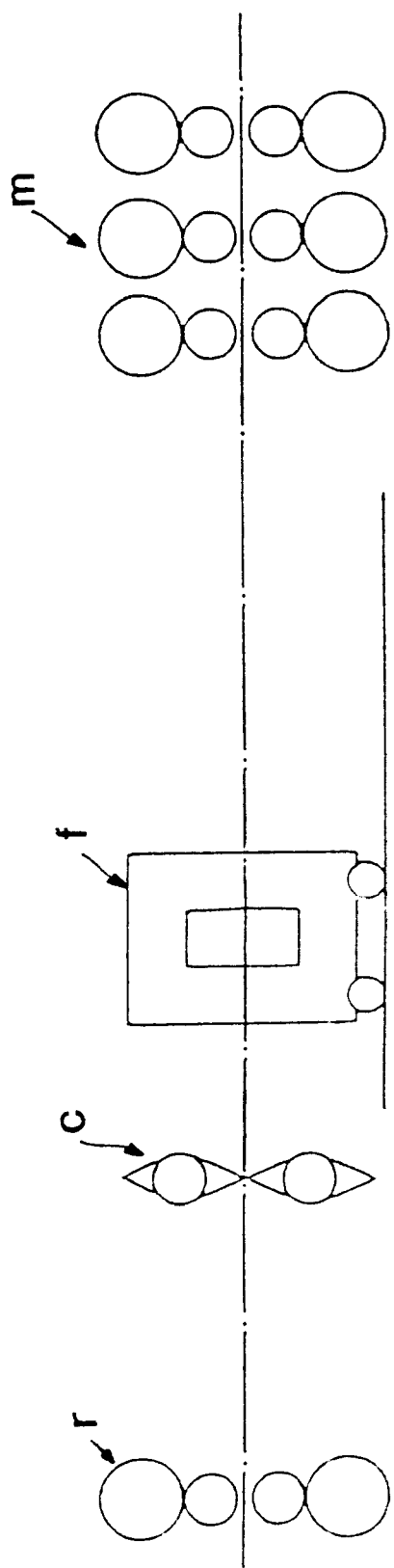
FIG. 14 is a view showing a state in which the joining apparatus is arranged in line with the continuous hot rolling equipment.

The entire construction of the joining apparatus shown in the above-mentioned FIG. 12 is illustrated in FIG. 13, and a state in which said apparatus is arranged in line with the continuous hot rolling equipment is illustrated in FIG. 14.

In FIG. 13 and FIG. 14, reference symbol "r" denotes a rough rolling mill, "c" is a Crop shear for working the end portion of the metal block in a desired shape, "m" is a group of finish rolling mills, and "f" is a movable frame constituting the joining apparatus. There may be arranged a winding/unwinding apparatus (not shown) for ensuring a time adjustment of the joining work and the rolling work of the metal blocks, between the rough rolling mill "r" and the Crop shear "c" in FIG. 14.

In order to form a butt-joint between the preceding metal block 1 and the succeeding metal block 2 at their respective end portions by using the apparatus shown in FIG. 12, the preceding metal block 1 is restrained and positioned by the clamps 14 as shown in FIG. 15(a), and the succeeding metal block 2 is subsequently restrained and positioned by the other clamps 14 such that a gap "g" is formed between the preceding metal block 1 and the succeeding metal block 2. The metal blocks are then heated to an elevated temperature by the induction heating coil 9. The clamps 14 of which the seizing portions 15 extend over both of the metal blocks are moved as shown in FIG. 15(b), with the metal blocks caused to slide at the insulation portion, to butt the succeeding metal block 2 against the end surface of the preceding metal block 1. In this instance, the preceding metal block 1 may be moved toward the succeeding metal block 2.

The apparatus constituted as shown in the above-mentioned FIG. 12 has been illustrated as an embodiment in which the seizing portions 15 are extended over the preceding metal block 1 and the succeeding metal block 2 together with the insulating material 17. However, according to the invention, the seizing portions 15 can be arranged on the respective clamps 14 of the preceding metal block 1 and the succeeding metal block 2, as shown in FIG. 16. In this instance also, it is possible to prevent dislocation, in the vertical direction, of the metal blocks when they are pressed to each other.

However, such a construction may have disadvantageous facet in preventing the vertical dislocation or bucklings of the metal blocks for ensuring a positive joining. Thus, it is preferable to arrange the seizing portions 15 so as to extend over both of the preceding metal block 1 and the succeeding metal block 2.

This is due to the following reasons. It is important for the butted faces of the preceding metal block 1 and the succeeding metal face 2 to be aligned with the center of the induction heating coil 9, i.e., the dimensional center of the metal block in the longitudinal direction thereof, though certain dislocation is inevitable upon positioning. Also, when carrying out the heating between the preceding metal block 1 and the succeeding metal block 2 to an elevated temperature, there may be instances wherein the metal blocks are intentionally dislocated to perform an asymmetrical heating. In this case, if both of the metal blocks are pressed to each other as shown in FIG. 16, the end portions of the metal blocks exhibit an enhanced tendency to be dislocated in a vertical direction, and the dislocation amount increases when the metal blocks themselves are curved. Accordingly, it is most appropriate to provide one set of the clamps for restraining the metal blocks, with the seizing portion 15 having the insulation material 17 so that, upon pressing the preceding metal block 1 and the succeeding metal block 2, the level of both of the metal blocks are aligned with each other.

The reason why the insulating material 17 is disposed on the seizing portion 15 is that, when the seizing portion 15 is disposed to extend over both of the metal blocks, the metal blocks are brought into contact with the seizing portion 15 so that an induced current flows between both of the metal blocks through the seizing portion 15, thereby making it difficult to effectively heat the end portions of the metal blocks to an elevated temperature.

As shown in the above-mentioned FIG. 16, also when the seizing portions 15 are disposed on the respective metal blocks, the insulating material 17 is preferably arranged between the seizing portion 15 and the metal blocks so as eliminate the influence of the induced current to the metal blocks.

In FIG. 12 mentioned above, there is shown one embodiment in which the seizing portion 15 disposed on each of the preceding metal block 1 and the succeeding metal block 2 includes a notch portion 15a. However, when one of the seizing portions 15 is shifted from the position of the induction heating coil 9, or when the induced current due to the application of the alternating magnetic field by the induction heating coil 9 does not give rise to particular problems, it is not necessary for the other of the seizing portion 15 to have the notch portion 5a.

Moreover, when the magnetic flux due to the induction heading coil 9 is applied not only to the seizing portions 15 but also to the clamps 14, the notch portions 5a are preferably extended and formed to reach to the clamps 14.

Figure 17:
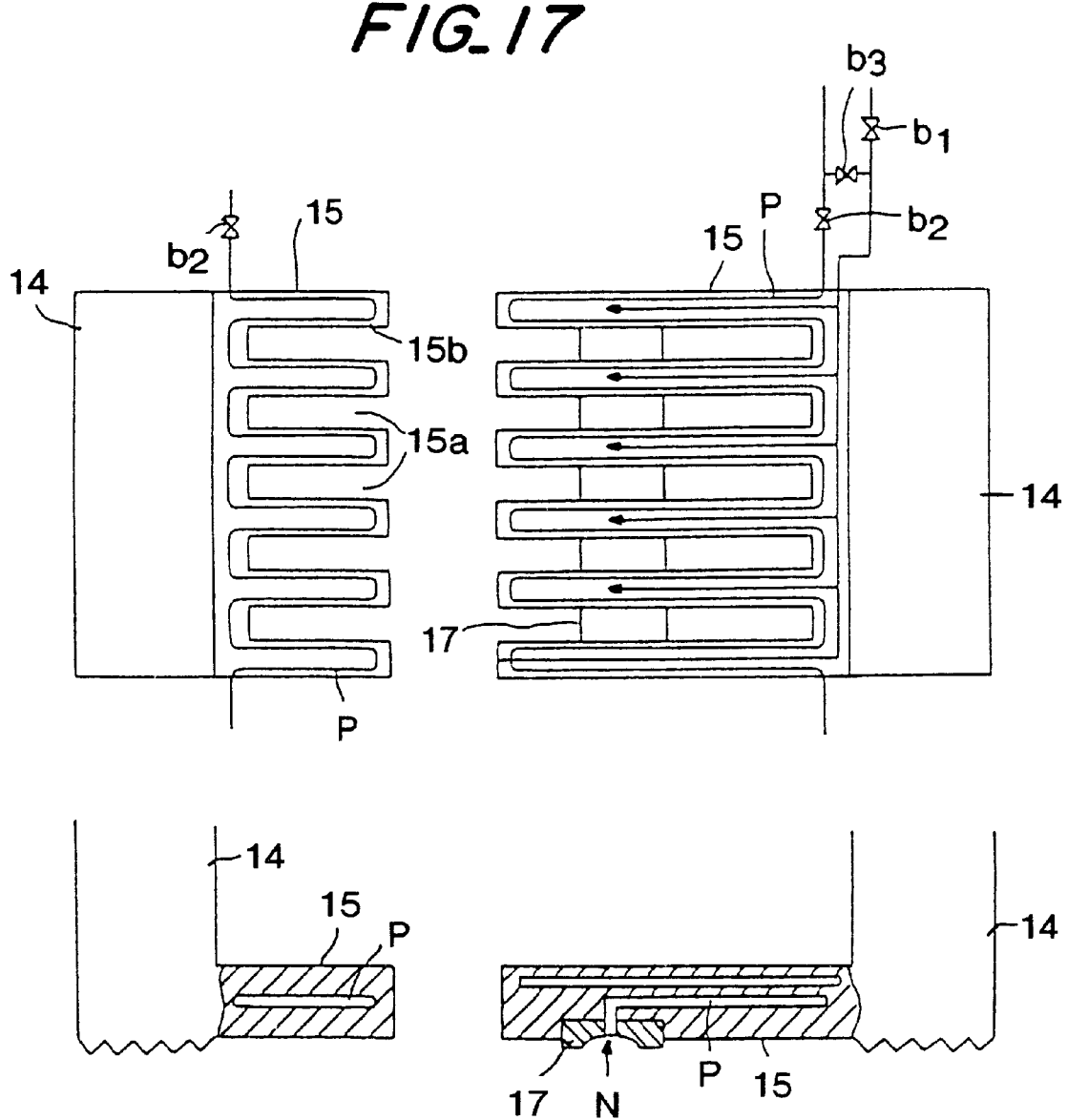
FIG. 17 is a view showing the structure of the joining apparatus according to another embodiment.

FIG. 17 shows one embodiment in which a cooling water passage "p" is disposed inside the seizing portion 15 to realize a water cooling type structure, and a nozzle N is disposed through the insulating material 17 for ejecting a non-oxidizing or reducing gas or a cooing water onto the to-be-joined face of the metal blocks.

When the temperature of the seizing portion 15 is inevitably increased upon heating the metal blocks, the increase can be suppressed by circulating the cooling water inside the seizing portion 15. Moreover, upon butt-joining of the metal blocks, the non-oxidizing gas or reducing gas is ejected onto the to-be-joined face by performing a changeover from the nozzle N to valves $b_1$–$b_3$ so that the ejected portion is prevented from oxidization, thereby making it possible to realize a joined portion with high strength. The strength can be further improved by changing over the valves $b_1$–$b_3$ after completion of the joining, so as to eject the cooling water onto the joined portion and lower the temperature of the ejected portion. It should be noted that the joined portion may be broken upon variation of tension or the like, when the temperature of the joined portion is 1,450° C. or more. As regards the cooling of the joined portion, it is preferable to effect the cooling at a flow rate of 100–400 t/h (one side face). There may be used a nozzle N of 1–2 mm in diameter, or of a slit type which is about 1 mm in gap and 5–10 mm in width.

Figure 18:
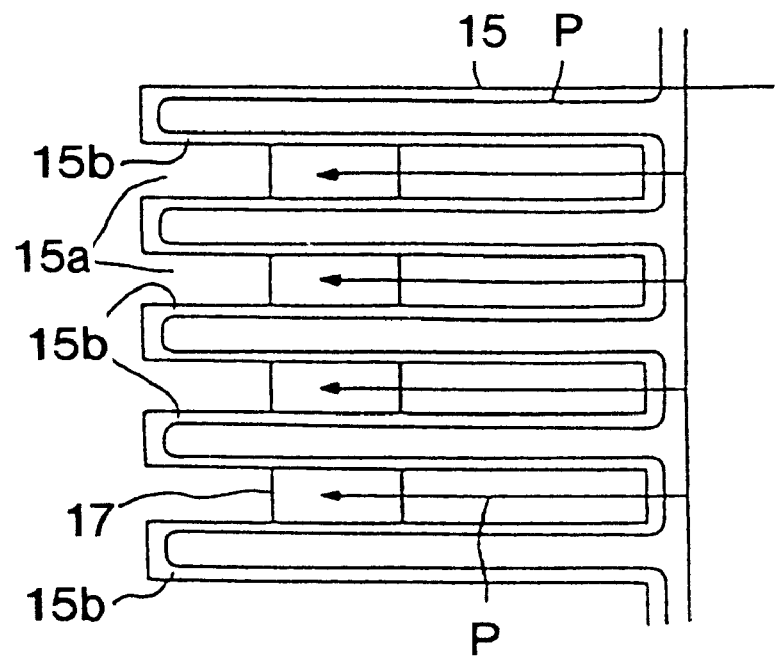
FIG. 18 is a view showing the structure of the joining apparatus according to another embodiment.

In FIG. 17, the cooling water and the like is ejected through the seizing portion 15 and the insulating material 17. However, as shown in FIG. 18, the nozzle N may be directly attached to the insulating material 17 through the notch portion 15a.

Figure 19:
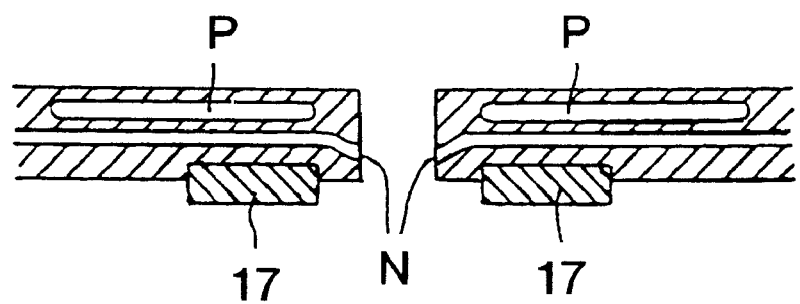
FIG. 19 is a view showing the structure of the joining apparatus according to another embodiment.

When the seizing portion 15 and the insulating material 17 are disposed on each of the metal blocks as shown in FIG. 16, the nozzles N may be disposed onto the leading ends of the seizing portions 15, respectively, as shown in FIG. 19.

FIG. 20 shows one embodiment of the metal blocks joining apparatus provided with a seal box 18 which surrounds a rear end portion of the preceding metal block 1 and a fore end portion of the succeeding metal block 2, for maintaining the surrounded portions at an atmosphere of the non-oxidizing gas or reducing gas. The seal box has an expansion/contraction function so as to prevent interference with the clamps 14 as they are moved in a vertical direction.

By introducing the non-oxidizing gas such as $N_2$ gas and the like into the seal box 18, the inside of the seal box 18 can be maintained at an atmosphere which is suitable for joining. In this case, while the arrangement for exhausting the introduced gas is not shown in the drawings, a gas suction hole may be disposed in another side of the seal box 18 to discharge the gas therefrom.

The metal blocks can be advantageously joined to each other by using the seal box 18 shown in FIG. 20, particularly when the object is a metal which cannot be easily joined in the atmosphere, such as stainless steel including Cr, high carbon special steel having a low melting temperature, high manganese steel and the like.

The gas to be introduced into the seal box may be $N_2$ gas, Ar gas and the like, or may be a non-oxidizing gas such as $H_2$ gas, CO gas and the like. When such gas is used, the flow rate should be about 1–10 $Nm^3/min$.

When the metal block is carbon steel, for example, the oxide generated upon heating is ferrous oxide (FeO) and the melting point thereof is about 1,370° C. Even when it is mixed, for example, with MnO and the like, the melting temperature is in the vicinity of said temperature. It should be noted that the melting temperature of the metal changes depending upon the amount of carbon content. With respect to a steel having a solidus curve higher than the melting temperature of FeO, when the temperature is between the solidus curve and the melting point of FeO, the molten oxide can be discharged from an interface between the metal blocks when deforming the metal upon pressing the metal blocks.

Incidentally, as for a steel having a carbon content of about 0.70%, a solidus curve temperature where a dissolution is initiated substantially agrees with the melting point of Fe oxide, so that the oxide on the interface generated upon heating the metal block is not melted and may be left on the interface of the joined portion, making it difficult to obtain a satisfactory joined portion.

Moreover, since the oxide generated on the stainless steel is Cr oxide which is very strong and has a melting point much higher than that of the metal, when the metal blocks are joined by being heated in the atmosphere, the oxide is left on the interface as described above and it is thus very difficult to obtain a satisfactory joined portion.

These problems can be advantageously mitigated by using the seal box 18 such as that shown in FIG. 20.

Investigation has been carried out to ascertain the forming state of oxide with respect to metal blocks comprised, respectively, of an extremely low carbon steel and a stainless steel each cut by a Crop shear, whose end portions were maintained at 950–1,000° C. in the atmosphere for 15 seconds. As a result, it has been found that an oxide layer of several $\mu m$ in thickness was formed in case of the extremely low carbon steel, though formation of oxide was hardly recognized in case of the stainless steel. Incidentally, when these steels are further heated up to 1,400° C., oxide layer of about 60–70 $\mu m$ in thickness is formed in case of the extremely low carbon steel and also the oxide layer of several $\mu m$ is formed in case of the stainless steel. However, formation of such oxide layer can be prevented by establishing a non-oxidizing or reducing atmosphere only during the heating.

Moreover, in order to prevent oxidization of the to-be-joined face during the heating, it is preferable to adjust the atmosphere such that the oxygen concentration becomes 1% or less in case of the carbon steel, and about 0.1% in case of the stainless steel.

FIG. 21 shows a modified embodiment of the apparatus in FIG. 12 mentioned above. The embodiment shown in FIG. 21 has a construction in which the upper clamp 14 for restraining the metal blocks is vertically movable, and the seizing portion 15 disposed on one of the lower clamps 14 is adapted to slide on the sliding plate "t" disposed on the other of the lower clamps 14.

Such an arrangement of the apparatus ensures that the level of the lower clamps 14 is maintained constant and thus serves to advantageously improve the positioning accuracy in joining the metal blocks and the strength of the clamps.

By constructing the metal blocks joining apparatus as described above, the metal blocks can be effectively heated to an elevated temperature, and the vertical dislocation or the like caused during the pressing of the metal block can be minimized.

Next, explanation will be made of the joining apparatus having a construction in which the clamps and the pressing means are adapted to move in the widthwise direction of the metal block independently of the heating means for lower the thermal load, etc., to which the clamps and the pressing means are subjected.

Figure 24:
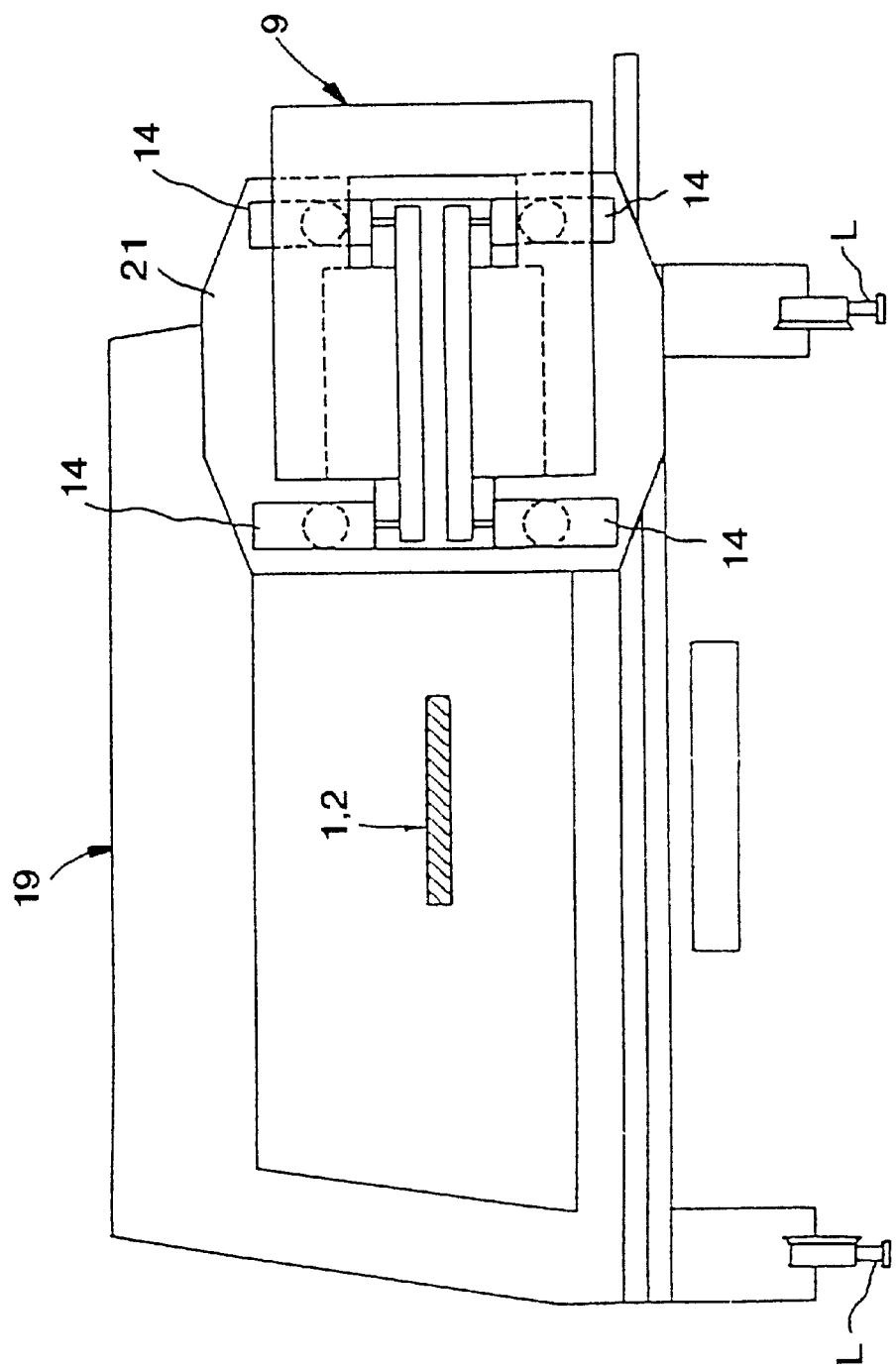
FIG. 24 is a sectional view taken along the line II—II of FIG. 22.

The construction is shown in FIG., 22 to FIG. 24.

In the drawings, reference numeral 19 denotes a carriage which is movable on a rail L disposed along a conveying line of the metal blocks. The induction heating coil 9 as the heating means is shown as, for example, a C-shape core for sandwiching the metal blocks from above and below, and is provided with a coil wound around the core and an electric source (not shown). The induction heating coil 9 is suspended and supported on a frame 20 (moving means) through wheels 20a, and the frame 20 extends along the widthwise direction of the metal block in the carriage 19, such that the induction coil 9 is adapted to move independently in the widthwise direction of the metal block in the carriage 19 as shown in FIG. 23. The moving means in the carriage 19 of the induction heating coil 9 may be of a slide type.

Also, reference numeral 21 denotes a frame (moving means) of an integral type including upper and lower portions, which is movable in the widthwise direction independently of the induction heating coil 9. The frame 21 comprises clamps 14 for adjusting the levels of the metal blocks, and a hydraulic cylinder (pressing means) 12 for moving and pressing at least one of the preceding metal block and the succeeding metal block toward each other when they are press-sandwiched and supported by the clamps 14. As a moving mechanism disposed in the carriage 19 of the frame 21 for moving the clamps 14 and the hydraulic cylinders 12, there may be provided a mechanism comprising a rail $L_1$ and wheels 21a adopted to the rail $L_1$, though a moving mechanism such as a roller type mechanism, a slide type mechanism or the like may also be applied. It should be noted that the moving mechanism is not shown in FIG. 23 and FIG. 24. Further, reference numeral 22 denotes table rollers for conveying the metal blocks, which are vertically movable according to the movement of the carriage 19 so as to achieve a function of preventing collision against the carriage 1.

In thus constructed metal blocks joining apparatus, the joining of the preceding metal block 1 and the succeeding metal block 2 is carried out, as shown in FIG. 22 and FIG.

23, by restraining the end portions of the metal blocks by the clamps 14 moved in the carriage 19 into the in-line position, heating each end portion to an elevated temperature by the induction heating coil 9 which has been moved in the carriage 19, and pressing at least one of the preceding metal block 1 and the succeeding metal block 2 toward each other by the hydraulic cylinders 12 which have been moved together with the clamp 14 into the in-line position to thereby butt the respective metal blocks to each other.

After completion of one cycle of continuous rolling wherein 15 metal blocks, for example, are joined and then transferred to a group of hot finish rolling mills, as shown in FIG. 24, the induction heating coil 9 is moved along the frame 20 and a frame 21 provided with the clamps 14 and the hydraulic cylinders 12 is moved along the rail $L_1$ from the conveying line P of the metal blocks so that the induction heating coil 9 assumes a waiting position until arrival of the next metal blocks. Incidentally, when the clamps 14 and the hydraulic cylinder 12 are supposed to be moved off the line in the course of conveying the metal blocks, it is preferable for the frame 21 to be formed into the same C-like shape as the induction heating coil 9, or as a frame which can be opened vertically.

FIG. 25 shows one embodiment of the continuous hot rolling equipment of the metal blocks, in which the joining apparatus constructed as above can be suitably arranged.

The joining apparatus is arranged between the cutting apparatus 23 on the outlet side of the rough rolling mill "r" for finishing the end portion of the metal block in a predetermined plain shape prior to the joining of the metal blocks, and a group of hot finish rolling mills 24. In such a type of continuous hot rolling equipment, there may be instances in which a winding/unwinding apparatus is arranged on the outlet side of the rough rolling mill "r" in order to adjust the treating amount in the rough rolling and finish rolling steps.

FIG. 26 shows a conveying state of the metal blocks in the carriage 19, with the induction heating coil 9, the clamps 14 and the hydraulic cylinder 12 moved off the line.

Usually, the metal blocks are conveyed in the carriage 19 while being slid. However, in the apparatus according to the invention, the inside of the carriage 19 can be made empty, so that vertically movable support rollers 25 are additionally disposed therein so as to support the metal blocks. The support rollers may be of a type in which the rollers are attached to the carriage 19 and caused to move upwards only when they are used, or of a type in which the rollers are arranged below the carriage 19 for avoiding collision with the carriage 19 as it moves, and are caused to move upwards only when they are used. Such an arrangement serves to advantageously prevent formation of scratches due to scales deposited in the carriage 19.

As described above, in the joining apparatus constructed as shown in FIG. 22 to FIG. 24, the clamp and the pressing means subjected to a substantial thermal load are moved off the line when the metal blocks need not be joined, so that their life time can be extended and it becomes possible to prevent formation of scratches due to the deposition of scales. Further, when maintenance is required for some troubles, the operation can be continued without stopping the operation of the line, by substituting another frame provided with the clamps and the pressing means. It is thus possible to perform a hot rolling with a high productivity, requiring a relatively small space since the entire joining apparatus need not be moved.

A table roller device for conveying the metal blocks will be described below.

Figure 27:
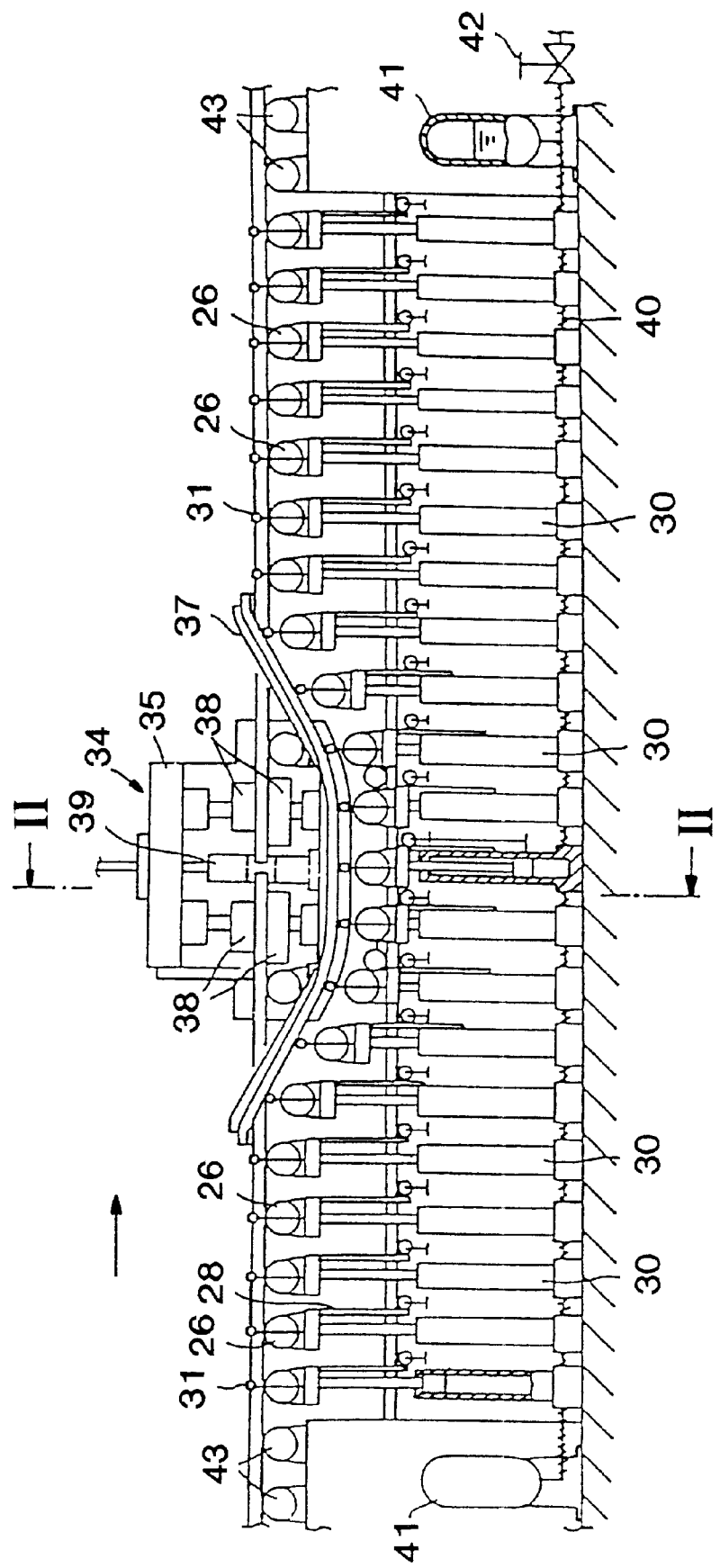
FIG. 27 is a view explaining the structure of the table roller conveyor for conveying the metal blocks.
Figure 28:
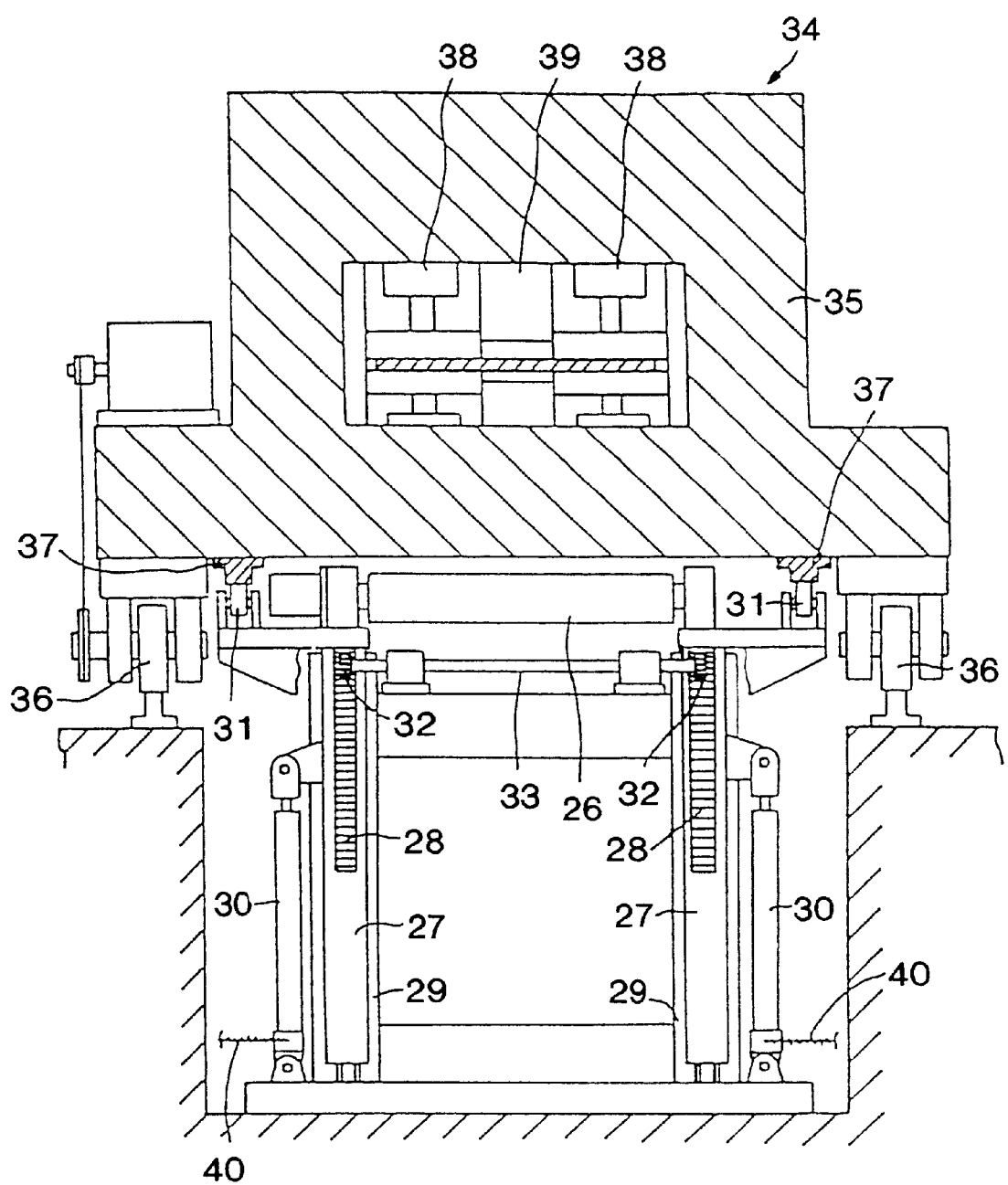
FIG. 28 is a sectional view taken along the line II—II of FIG. 27.

The construction is shown in FIG. 27 and FIG. 28, of which the latter is a sectional view taken along the line II—II of FIG. 27.

In the drawings, a table roller device for conveying the metal blocks comprises a plurality of rollers 26 for supporting the metal blocks at a plurality of positions along the longitudinal direction of the metal blocks. For each table roller, both ends thereof are rotatably supported on a set or pair of table roller supporting members 27. A rack 28 is attached on a side face of each table roller supporting member 27 and mounted movably along a vertical guide frame 29. Reference numeral 30 denotes cylinders (i.e., balance cylinders) connected at one end to the guide frame 29 and at another end to the table roller supporting member 27. Reference numeral 31 denotes guide rollers, which are held rotatably on the upper portion of the guide frame 29.

Reference numeral 32 denotes pinions connected to a mechanical tying shaft 33 and supported rotatably on the upper portion of the guide frame 29.

Reference numeral 34 denotes a joining apparatus movable along the rail $L_2$, which is provided with a frame 35, wheels 36, boat-like guide rails 37 disposed on both sides of a lower face of the frame 35 and having an inlet portion and an outlet portion both inclined toward a center portion thereof, clamps 38 for sandwiching the metal blocks from above and below to restrain them, and a heating means 39.

Reference numeral 40 denotes a hydraulic pipe connected to head sides of the respective cylinders 30 and provided with an accumulator 41 and a shut valve 42 on the way up to the rolling apparatus (not shown).

Reference numeral 43 denotes fixed table rollers which are not allowed to undergo a vertical motion and which are disposed on the inlet and outlet sides of the metal blocks joining apparatus 34 and used for conveying the metal blocks.

In thus constructed table roller device for conveying the metal blocks, a predetermined pressure is applied to the inlet side of each cylinder 30 and the accumulator 41, and the pressure is maintained by closing the shut valve 42.

The metal blocks are conveyed through the table roller 43 with the joining apparatus 34 shifted toward a side in which the succeeding metal block is conveyed, and the joining apparatus 34 is then moved at the same speed as the metal blocks when they reach the joining apparatus 34. The preceding metal block 1 and the succeeding metal block 2 are then restrained by the clamps 38, respectively, and then heated to an elevated temperature by the heating means 39 until the metal blocks reach a stop end of the joining apparatus 34, where the joining of the metal blocks is finished.

When the joining apparatus 34 moves, the guide rail 37 moves together with the joining apparatus 34. On this occasion, the guide rollers 31 and the table rollers 26 situated between the inclined inlet portion and the center portion of the guide rail 37 are caused to move upwards according to the passage of the joining apparatus 34. Conversely, the guide rollers 31 and the table rollers 26 situated between the inclined outlet portion and the center portion of the guide rail 37 are urged by the inclined outlet portion and the center portion of the guide rail 37 due to the arrival of the joining apparatus 34 and thereby caused to move downwards. Accordingly, the metal blocks are prevented from colliding against the frame 35 constituting the joining apparatus 34.

The metal blocks conveying table roller device according to the invention is so constructed that the head sides of the respective cylinders 30 for supporting the table rollers 26 together with the supporting member 27 from below are connected to each other by the hydraulic pipe 40, forming a hydraulic circuit for maintaining the pressure in the respective head sides at a constant pressure. Thus, the oil inside the cylinder 30 associated with the table rollers 26 and the supporting members 27 which have moved downwards is merely transferred to the cylinder 30 associated with the table rollers 26 and the supporting members 27 which have moved upwards, thereby making it possible to positively support the metal blocks while the table rollers are prevented from colliding against the joining apparatus 34. It is unnecessary to operate or control the valves for this purpose.

In the construction having the supporting members 27 for supporting the table rollers 26 at the respective shaft ends thereof, by connecting the both side portions of the supporting members through the mechanical tying shaft 33, the table rollers 26 are always held horizontally even when the guide rollers 31 are not guided on the guide rail 37, so that the metal blocks can be positively supported and conveyed.

As shown in FIG. 27 and FIG. 28 mentioned above, when, for example, the heating means, the pressing means and the clamps are taken out from the joining apparatus 34 and only the frame 35 is arranged at the in-line waiting position where the metal blocks are not joined, the metal blocks may not be properly supported in the frame 35 by the table rollers 26.

Figure 29:
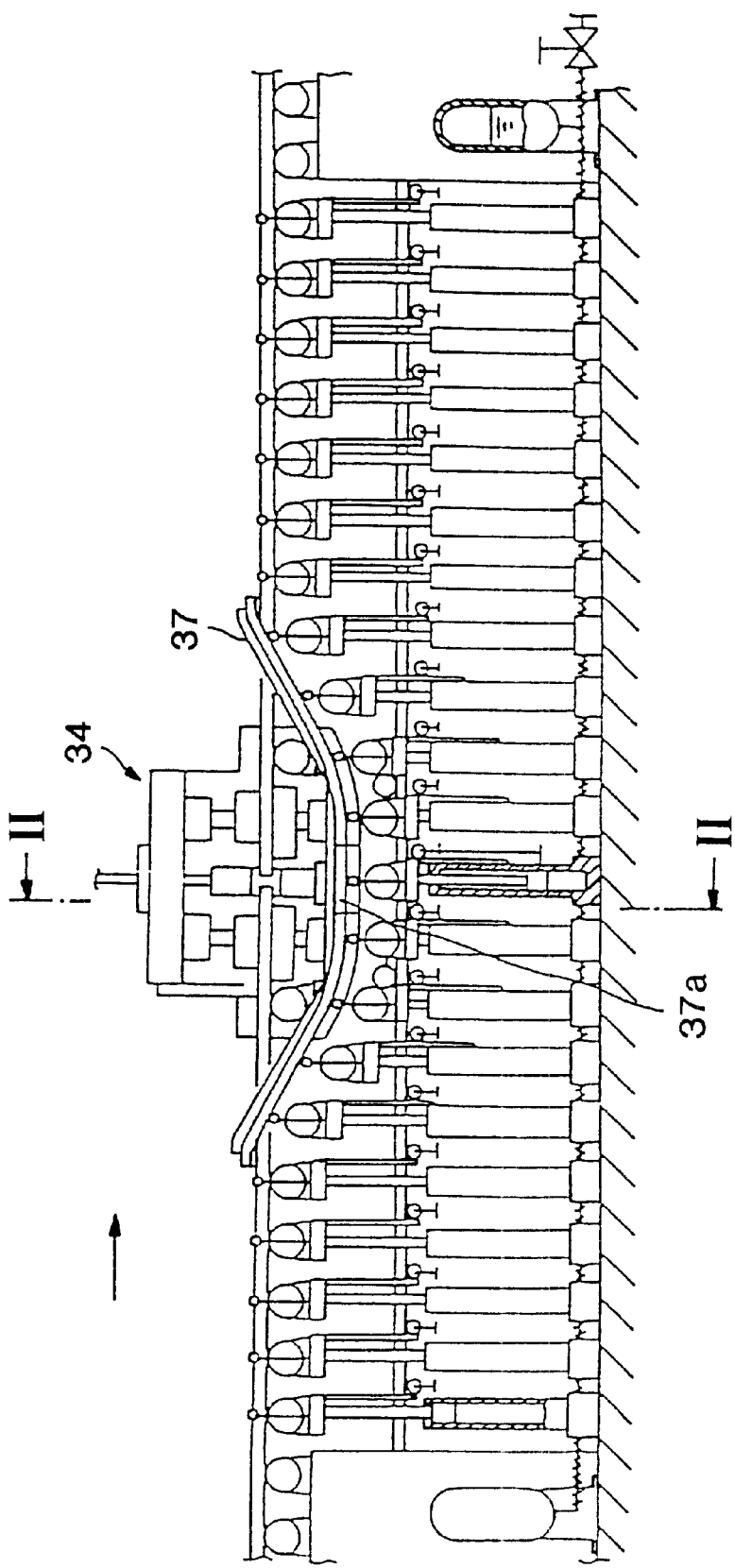
FIG. 29 is a view showing another embodiment of the table roller conveyor shown in FIG. 27.
Figure 30:
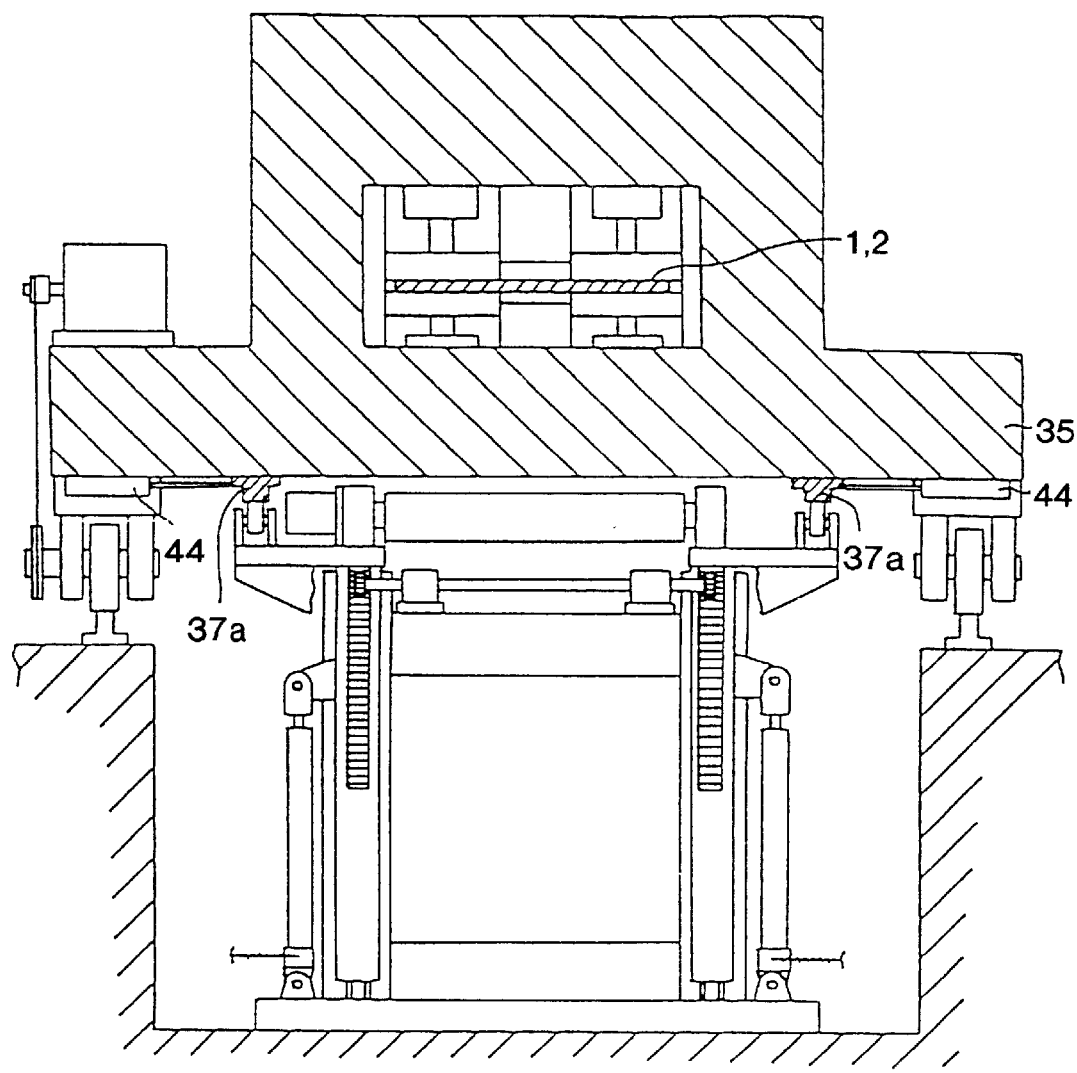
FIG. 30 is a sectional view taken along the line II—II of FIG. 29.

In this case, as shown in FIG. 29 and FIG. 30 which is a sectional view taken along the line II—II in FIG. 29, a detachable shift guide rail 37a is disposed on, for example, a center portion of the guide rail 37 and the shift guide rail 37a is moved in a direction away from the conveying line as shown in FIG. 31 by a shifting cylinder disposed on the frame 35, to thereby ensure a space through which the table rollers 26 can be moved upwardly so as to face the conveying line.

In order to cause an upward movement of the table rollers 26 existing in that area, the pressure of the hydraulic pipe 40 is once lowered and the shift guide rail 37 is moved in a direction away from the convener line. Then, by applying a pressure to the hydraulic pipe 40, the table rollers 26 are moved upwardly via the cylinders 30 and table roller supporting members 27.

For performing the above-mentioned operations, the shut valve 42 is preferably comprised of a three-way valve and the like, having the functions of opening, closing and pressure-releasing.

Moreover, FIG. 29 to FIG. 31 show an embodiment of the shift guide rail 37a having a length which is sufficient for causing an upward movement of only one of the table rollers 26. However, when the guide rails 37 are long enough to allow an upward movement of a plurality of the table rollers, it is enough to lengthen the shift guide rails 37a by a corresponding amount.

In the metal blocks conveying table roller device constructed as above, the cylinders 30 supporting the table rollers 26 from below are equivalent in pressure with each other, and the sum of descending displacements of the respective table rollers moved by butting the guide rail 37 with the guide rollers 31 is always constant. Thus, only by maintaining a constant pressure in the hydraulic circuit including the cylinder 30, the hydraulic pipe 40, accumulator 41, and the shut valve 42, the vertical motion can be performed without additional provision of a hydraulic apparatus and the like having an electromagnetic valve for the vertical motion, so that the power required for driving the guide roll can be saved.

Moreover, both ends of the table rollers 26 are connected through the mechanical tying means and are thus always maintained at the same level. Thus, even when the guide rollers 31 turn out not to be guided on the guide rail 37, the table rollers 26 facing the conveying line can be held horizontally due to an urging force in the head side of the cylinder 30, thereby allowing the metal blocks to be positively supported and conveyed.

INDUSTRIAL APPLICABILITY

According to the invention, the following advantageous effects can be achieved.

(1) Since the deformation of the fore end portion and the rear end portion of the metal blocks upon heating and pressing can be prevented, it is possible to prevent joining of the relatively dislocated metal blocks and occurrence of buckling. Accordingly, it is possible to prevent during the rolling a breakage of the plate due to such dislocation (the first to third inventions).

Also, it is possible to achieve a proper joining by ejecting gas and water to optimize the joining condition of the metal blocks, thereby allowing a continuous hot rolling to be performed with a high productivity.

(2) The table rollers can be prevented from collision against the moving type joining apparatus without performing a complicated control relating to the vertical motion of the table rollers, so that the metal blocks can be conveyed stably (the forth invention).

(3) A smooth rolling can be performed over the entire length of the metal blocks including the connected portion (the fifth invention).

(4) The poor joined portion can be removed effectively. Further, the strength of the connected portion of the metal blocks can be increased so that the plate during transfer does not undergo a breakage even upon significant deviation in tension (the sixth invention).

(5) The end portions of the metal blocks are prevented from a vertical dislocation or buckling (the seventh to the ninth inventions). Also, the seizing portion of the clamps can be prevented from being welded or deposited to the plate, and the heating efficiency can be improved (the eighth and the ninth inventions).

(6) Not only the induction heating coil but also the clamps and the pressing means can be moved properly to the outside of the line, so that the thermal load of the entire joining apparatus can be minimized and the maintenance of the joining apparatus can be performed easily. Conventionally, the table rollers for conveying the metal blocks could not be arranged inside the carriage, so that a construction over which the metal blocks moves in a sliding manner could not be adopted. In this instance, it was impossible to prevent formation of scratches when scales are deposited. According to the invention, however, formation of scratches due to scales can be prevented, since the metal blocks can be supported by the guide rollers and the like in the carriage with the heating means, the clamps and the pressing means evacuated (the tenth invention).

(7) Since the vertical movement of the table rollers is automatically and promptly performed according to the running state of the joining apparatus, it is possible to avoid an accident wherein the joining apparatus collides against the table rollers. Also, it is possible to avoid a situation wherein the metal blocks cannot be supported due to a slow upward motion of the table rollers after the passage of the joining apparatus. Further, since the table roller device is of a balance type, the table rollers can be moved vertically by allowing the hydraulic oil of the cylinders for supporting the table rollers to flow just from one to another in accordance with the movement of the joining apparatus. To this end, it is only necessary to pressurize the inside of the hydraulic circuit at a constant pressure and a complicated control is not required to operate the hydraulic apparatus for vertically moving the table rollers, making it possible to minimize the power consumption. Furthermore, the table rollers on both sides can be held at the same level even when the guide rollers do not contact with the guide rail, so that the metal blocks can be positively supported and conveyed (the eleventh invention).

What is claimed is:

1. A metal block conveying apparatus in a continuous hot rolling wherein a rear end portion of a preceding metal block and a fore end portion of a succeeding metal block are heated and pressed against each other so that the preceding metal block and the succeeding metal block are joined to each other by a movable joining apparatus while the metal blocks are conveyed along the conveying apparatus together with the joining apparatus, said metal block conveying apparatus comprising:

a plurality of table rollers and guide rollers for supporting the metal blocks at a plurality of positions along a longitudinal direction of the metal blocks;

guide rails that are movable with the joining apparatus and engaged with said guide rollers, said guide rails each having a guide surface with a predetermined profile;

a plurality of cylinders arranged below and supporting the respective guide rollers, said cylinders being operable to follow movement of the respective guide rollers vertically;

upwards and downwards as the guide rollers are moved relative to, and along the guide surfaces of the guide rails; and a hydraulic circuit comprised of a hydraulic pipe which communicates cylinder heads of the cylinders with each other, for maintaining an inner pressure of each of the cylinder heads at a constant pressure.

2. The metal block conveying apparatus according to claim 1, wherein said hydraulic circuit is further comprised of an accumulator.

3. A continuous hot rolling mill comprising:

a metal block conveying apparatus for continuously conveying successive metal blocks; and a movable joining apparatus for joining a preceding metal block and a succeeding metal block to each other by heating and pressing a rear end portion of a preceding metal block and a fore end portion of a succeeding metal block against each other, while the metal blocks are conveyed along the conveying apparatus together with the joining apparatus, said metal block conveying apparatus comprising;

a plurality of table rollers and guide rollers for supporting the metal blocks at a plurality of positions along a longitudinal direction of the metal blocks;

guide rails that are movable with the joining apparatus and engaged with said guide rollers, said guide rails each having a guide surface with a predetermined profile;

a plurality of cylinders arranged below and supporting the respective guide rollers, said cylinders being operable to follow movement of the respective guide rollers vertically upwards and downwards as the guide rollers are moved relative to, and along the guide surfaces of the guide rails; and a hydraulic circuit comprised of a hydraulic pipe which communicates cylinder heads of the cylinders with each other, for maintaining an inner pressure of each of the cylinder heads at a constant pressure.

4. The continuous hot rolling mill according to claim 3, wherein said hydraulic circuit of the metal block conveying apparatus is further comprised of an accumulator.

* * * * *